United States Patent
Liu et al.

(10) Patent No.: US 10,680,874 B2
(45) Date of Patent: Jun. 9, 2020

(54) NETWORK SERVICE FAULT HANDLING METHOD, SERVICE MANAGEMENT SYSTEM, AND SYSTEM MANAGEMENT MODULE

(71) Applicant: Huawei Technologies Co., Ltd., Shenzhen (CN)

(72) Inventors: Jianning Liu, Beijing (CN); Lei Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 880 days.

(21) Appl. No.: 15/215,294

(22) Filed: Jul. 20, 2016

(65) Prior Publication Data
US 2016/0330067 A1 Nov. 10, 2016

Related U.S. Application Data

(63) Continuation of application No. PCT/CN2014/071007, filed on Jan. 21, 2014.

(51) Int. Cl.
*H04L 12/24* (2006.01)
*H04W 24/04* (2009.01)

(52) U.S. Cl.
CPC ........ *H04L 41/046* (2013.01); *H04L 41/0631* (2013.01); *H04L 41/0654* (2013.01); *H04W 24/04* (2013.01)

(58) Field of Classification Search
CPC .............. H04L 41/046; H04L 41/0654; H04L 41/0631; H04W 24/04
See application file for complete search history.

(56) References Cited

U.S. PATENT DOCUMENTS

| | | | |
|---|---|---|---|
| 9,645,899 B1* | 5/2017 | Felstaine | G06F 11/2002 |
| 10,073,729 B2* | 9/2018 | Liu | H04L 41/0677 |
| 2010/0054132 A1 | 3/2010 | Mitsumori | |
| 2010/0146342 A1* | 6/2010 | Davenport | G06F 11/0775 |
| | | | 714/47.2 |

(Continued)

FOREIGN PATENT DOCUMENTS

| CN | 101247617 A | 8/2008 |
|---|---|---|
| CN | 101472288 A | 7/2009 |

(Continued)

OTHER PUBLICATIONS

3GPP TS 32.101 V5.5.0 (Sep. 2003); 3rd Generation Partnership Project; Technical Specification Group Services and System Aspects; Telecommunication management; Principles and high-level requirements (Release 5); 47 pages.

(Continued)

*Primary Examiner* — Andrew Lai
*Assistant Examiner* — Chuong M Nguyen
(74) *Attorney, Agent, or Firm* — Slater Matsil, LLP

(57) ABSTRACT

The method in the embodiments of the present invention includes after a service management system SMS detects that operating performance data of a VNF is abnormal, sending network service association request information to a system management module, where the network service association request information is used by the system management module to query a fault and feed back a network service association response to the SMS. The method also includes performing, by the SMS, fault diagnosis according to the network service fault association response and the operating performance data of the VNF, to obtain a network service fault diagnosis report. Additionally, the method includes sending the network service fault diagnosis report to the system management module, where the network service fault diagnosis report is used by the system management module to perform fault recovery.

20 Claims, 10 Drawing Sheets

(56) References Cited

U.S. PATENT DOCUMENTS

| | | | |
|---|---|---|---|
| 2011/0022882 A1* | 1/2011 | Jaehde | G06F 11/2023 714/4.1 |
| 2012/0089351 A1 | 4/2012 | Li | |
| 2013/0150985 A1* | 6/2013 | Ohkado | G06F 21/552 700/79 |
| 2014/0164840 A1 | 6/2014 | Luo et al. | |
| 2014/0201374 A1* | 7/2014 | Ashwood-Smith | H04L 49/70 709/226 |
| 2014/0317261 A1* | 10/2014 | Shatzkamer | G06F 9/45558 709/223 |
| 2015/0063166 A1* | 3/2015 | Sif | G06F 9/45533 370/254 |
| 2015/0089331 A1* | 3/2015 | Skerry | G06F 9/45533 714/799 |

FOREIGN PATENT DOCUMENTS

| | | |
|---|---|---|
| CN | 101777951 A | 7/2010 |
| CN | 103378982 A | 10/2013 |
| CN | 103428025 A | 12/2013 |
| RU | 2012101989 | 7/2013 |
| WO | 2013155912 A1 | 10/2013 |

OTHER PUBLICATIONS

ETSI GS NFV 001 V1.1.1 (Oct. 2013); "Network Functions Virtualisation (NFV); Use Cases"; F-06921 Sophia Antipolis Cedex-France; 50 pages.

ETSI GS NFV 002 V1.1.1 (Oct. 2013); "Network Functions Virtualisation (NFV)"; Architectural Framework; F-06921 Sophia Antipolis Cedex-France; 21 pages.

GS NFV INF 002 V0.3.2 (Nov. 22, 2013); "Network Functions Virtualisation Infrastructure Architecture"; F-06921 Sophia Antipolis Cedex-France; 37 pages.

GS NFV-MAN 001 V0.2.0 (Dec. 2013); "Network Function Virtualization (NFV)"; Management and Orchestration; F-06921 Sophia Antipolis Cedex-France; 96 pages.

\* cited by examiner

NETWORK SERVICE FAULT HANDLING METHOD, SERVICE MANAGEMENT SYSTEM, AND SYSTEM MANAGEMENT MODULE

CROSS-REFERENCE TO RELATED APPLICATIONS

This application is a continuation of International Application No. PCT/CN2014/071007, filed on Jan. 21, 2014, which is hereby incorporated by reference in its entirety.

TECHNICAL FIELD

The present invention relates to the communications field, and in particular, to a network service fault handling method, a service management system, and a system management module.

BACKGROUND

Network functions virtualization (NFV) is initiated by 13 global major telecommunications operators, and many device vendors and IT manufacturers participate in organization of the NFV, aiming at defining a requirement of the operators for network functions virtualization and a related technical report, and hoping to implement a shift to some software defined network functions by referring to a virtualization technology of the information technology IT and using a universal high-performance and large-capacity server, switch, and memory. In this way, various types of network devices, such as a server, a router, a storage device, a CDN, and a switch, can implement separation of software and hardware by using a network functions virtualization technology, so that the devices may be deployed in a data center, a network node, or a user's home.

NFV may completely separate software that defines a network function from a universal high-performance hardware server, memory, and network switch, so as to implement a modular characteristic that software is independent of a hardware component, and complete remote automatic installation and management of a software device based on universal hardware.

However, currently, there is still no method for managing a network service fault in an NFV environment; fault management based on a conventional network element entity is not suitable for the NFV virtual environment, and when a fault occurs in a network service in the NFV environment, the fault cannot be handled in a timely manner to maintain stability of an NFV system.

SUMMARY

Embodiments provide a network service fault handling method, a service management system, and a system management module, which are used to handle a network service fault in an NFV environment, so as to maintain stability of an NFV system.

A first aspect of the embodiments provide a service management system, including a monitoring module, configured to monitor operating performance data of a virtual network function entity VNF and a judging module, configured to determine, according to the operating performance data that is of the VNF and monitored by the monitoring module, whether network service performance is abnormal. The service management system also includes an information requesting module, configured to: when the judging module determines that the network service performance is abnormal, send network service fault association request information to a system management module, where the network service fault association request information is used by the system management module to query a fault and feed back a network service fault association response to a fault diagnosis module. Additionally, the service management system includes the fault diagnosis module, configured to perform fault diagnosis according to the network service fault association response and the operating performance data that is of the VNF and monitored by the monitoring module, so as to obtain a network service fault diagnosis report. The service management system includes a report sending module, configured to send the network service fault diagnosis report obtained by the fault diagnosis module to the system management module, where the network service fault diagnosis report is used by the system management module to perform fault recovery.

With reference to the first aspect of the embodiments, in a first implementation manner of the first aspect of the embodiments, the monitoring module is specifically configured to periodically receive the operating performance data that is of the VNF and sent by an element management system EMS.

With reference to the first implementation manner of the first aspect of the embodiments, in a second implementation manner of the first aspect of the embodiments, the system further includes a configuration receiving module, configured to receive a configuration parameter value range sent by an orchestrator. The judging module specifically includes a judging unit, configured to determine whether the operating performance data of the VNF falls within the configuration parameter value range received by the configuration receiving module; a normality determining unit, configured to: when the judging unit determines that the operating performance data of the VNF falls within the configuration parameter value range, determine that the network service performance is normal; and an anomaly determining unit, configured to: when the judging unit determines that the operating performance data of the VNF falls outside the configuration parameter value range, determine that the network service performance is abnormal.

With reference to any implementation manner of the first aspect to the second implementation manner of the first aspect of the embodiments, in a third implementation manner of the first aspect of the embodiments, the fault diagnosis module specifically includes: a fault determining unit, configured to determine a root fault and a pseudo fault with reference to the operating performance data that is of the VNF and monitored by the monitoring module and the network service fault association response, where the pseudo fault is a fault that can be resolved along with recovery of the root fault; a fault analysis unit, configured to perform analysis on the root fault and the pseudo fault that are determined by the fault determining unit, so as to obtain a handling policy; and a report generating unit, configured to generate the network service fault diagnosis report according to the root fault, the pseudo fault, and the handling policy that is obtained by means of analysis by the fault analysis unit.

With reference to the third implementation manner of the first aspect of the, in a fourth implementation manner of the first aspect of the embodiments, the fault determining unit is specifically configured to search a data fault information list with reference to anomaly data in the operating performance data that is of the VNF and monitored by the monitoring module and fault information in the network service fault association response, so as to obtain the corresponding root fault and the corresponding pseudo fault, where the pseudo fault is the fault that can be resolved along with the recovery of the root fault.

With reference to the fourth implementation manner of the first aspect of the embodiments, in a fifth implementation manner of the first aspect of the embodiments, the service management system is deployed in the Orchestrator; or the service management system is deployed in the system management module; or the service management system is deployed in the EMS.

A second aspect of the embodiments provide a system management module, including a request receiving unit, configured to receive network service fault association request information sent by a service management system SMS and a fault query unit, configured to query fault information within a management scope according to the network service fault association request information received by the request receiving unit. The system management module also includes an information conversion unit, configured to convert the fault information queried by the fault query unit into a network service fault association response and a sending unit, configured to send, to the SMS, the network service fault association response obtained by means of conversion by the information conversion unit. Additionally, the system management module includes a report receiving unit, configured to receive a network service fault diagnosis report sent by the SMS, where the network service fault diagnosis report is obtained after the SMS performs fault diagnosis according to the network service fault association response sent by the sending unit and operating performance data of a virtual network function entity VNF and fault recovery unit, configured to perform fault recovery according to the network service fault diagnosis report received by the report receiving unit.

With reference to the second aspect of the embodiments, in a first implementation manner of the second aspect of the embodiments, when the system management module is a network management system NMS, the fault query unit is specifically configured to query, according to the network service fault association request information received by the request receiving unit, fault information of a device that is managed.

With reference to the second aspect of the embodiments, in a second implementation manner of the second aspect of the embodiments, when the system management module is a virtualized network function manager VNFM. The fault query unit specifically includes: a first query subunit, configured to query, according to the network service fault association request information received by the request receiving unit, fault information of a VNF that is associated with a network service requested by the network service fault association request information; and a second query subunit, configured to query, by using a virtualized infrastructure manager VIM and according to the network service fault association request information received by the request receiving unit, fault information of a network functions virtualization infrastructure NFVI associated with the network service. The information conversion unit is specifically configured to convert the fault information of the VNF and the fault information of the NFVI into the network service fault association response.

A third aspect of the embodiments provide a service management system, including an input apparatus, an output apparatus, a processor, a memory, and a bus. The processor performs the following operations: monitoring operating performance data of a virtual network function entity VNF; determining, according to the operating performance data of the VNF, whether network service performance is abnormal; when the network service performance is abnormal, sending network service fault association request information to a system management module, where the network service fault association request information is used by the system management module to query a fault and feed back a network service fault association response; performing fault diagnosis according to the network service fault association response and the operating performance data of the VNF, so as to obtain a network service fault diagnosis report; and sending the network service fault diagnosis report to the system management module, where the network service fault diagnosis report is used by the system management module to perform fault recovery.

With reference to the third aspect of the embodiments, in a first implementation manner of the third aspect of the embodiments, the processor specifically performs the following operation: periodically receiving the operating performance data that is of the VNF and sent by an element management system EMS.

With reference to the first implementation manner of the third aspect of the embodiments, in a second implementation manner of the third aspect of the embodiments, the processor further performs the following operation: receiving a configuration parameter value range sent by an orchestrator; and the processor specifically performs the following operations: determining whether the operating performance data of the VNF falls within the configuration parameter value range; when the operating performance data of the VNF falls within the configuration parameter value range, determining that the network service performance is normal; and when the operating performance data of the VNF falls outside the configuration parameter value range, determining that the network service performance is abnormal.

With reference to any implementation manner of the third aspect to the second implementation manner of the third aspect of the embodiments, in a third implementation manner of the third aspect of the embodiments, the processor specifically performs the following operations: determining a root fault and a pseudo fault with reference to the operating performance data of the VNF and the network service fault association response, where the pseudo fault is a fault that can be resolved along with recovery of the root fault; performing analysis on the root fault and the pseudo fault, so as to obtain a handling policy; and generating the network service fault diagnosis report according to the root fault, the pseudo fault, and the handling policy.

With reference to the third implementation manner of the third aspect of the embodiments, in a fourth implementation manner of the third aspect of the embodiments, the processor specifically performs the following operation: searching a data fault information list with reference to anomaly data in the operating performance data of the VNF and fault information in the network service fault association response, so as to obtain the corresponding root fault and the corresponding pseudo fault.

A fourth aspect of the embodiments provide a system management module, including: an input apparatus, an output apparatus, a processor, a memory, and a bus; where the processor performs the following operations: receiving network service fault association request information sent by a service management system SMS; querying fault information within a management scope according to the network service fault association request information; converting the fault information into a network service fault association response; sending the network service fault association response to the SMS; receiving a network service fault diagnosis report sent by the SMS, where the network service fault diagnosis report is obtained after the SMS performs fault diagnosis according to the network service fault association response and operating performance data of a virtual network function entity VNF; and performing fault recovery according to the network service fault diagnosis report.

With reference to the fourth aspect of the embodiments, in a first implementation manner of the fourth aspect of the embodiments, when the system management module is a network management system NMS, the processor specifically performs the following operation: querying fault information of a device that is managed.

With reference to the fourth aspect of the embodiments, in a second implementation manner of the fourth aspect of the embodiments, when the system management module is a virtualized network function manager VNFM, the processor specifically performs the following operations: querying fault information of a VNF that is associated with a network service requested by the network service fault association request information; querying, by using a virtualized infrastructure manager VIM, fault information of a network functions virtualization infrastructure NFVI associated with the network service; and converting the fault information of the VNF and the fault information of the NFVI into the network service fault association response.

A fifth aspect of the embodiments provide a network service fault handling method, including: monitoring, by a service management system SMS, operating performance data of a virtual network function entity VNF; determining, by the SMS according to the operating performance data of the VNF, whether network service performance is abnormal; if the network service performance is abnormal, sending, by the SMS, network service fault association request information to a system management module, where the network service fault association request information is used by the system management module to query a fault and feed back a network service fault association response to the SMS; performing, by the SMS, fault diagnosis according to the network service fault association response and the operating performance data of the VNF, so as to obtain a network service fault diagnosis report; and sending, by the SMS, the network service fault diagnosis report to the system management module, where the network service fault diagnosis report is used by the system management module to perform fault recovery.

With reference to the fifth aspect of the embodiments, in a first implementation manner of the fifth aspect of the embodiments, the monitoring, by a service management system SMS, operating performance data of a virtual network function VNF includes: periodically receiving, by the SMS, the operating performance data that is of the VNF and sent by an element management system EMS.

With reference to the first implementation manner of the fifth aspect of the embodiments, in a second implementation manner of the fifth aspect of the embodiments, the operating performance data includes: throughput, a delay, or bandwidth.

With reference to the first implementation manner of the fifth aspect of the embodiments, in a third implementation manner of the fifth aspect of the embodiments, before the step of the determining, by the SMS according to the operating performance data of the VNF, whether network service performance is abnormal, the method includes: receiving, by the SMS, a configuration parameter value range sent by an orchestrator; and the determining, by the SMS according to the operating performance data of the VNF, whether network service performance is abnormal includes: determining, by the SMS, whether the operating performance data of the VNF falls within the configuration parameter value range; and if yes, determining that the network service performance is normal; or if no, determining that the network service performance is abnormal.

With reference to the fifth aspect of the embodiments, in a fourth implementation manner of the fifth aspect of the embodiments, the performing, by the SMS, fault diagnosis according to the network service fault association response and the operating performance data of the VNF, so as to obtain a network service fault diagnosis report includes: determining, by the SMS, a root fault and a pseudo fault with reference to the operating performance data of the VNF and the network service fault association response, where the pseudo fault is a fault that can be resolved along with recovery of the root fault; performing, by the SMS, analysis on the root fault and the pseudo fault, so as to obtain a handling policy; and generating, by the SMS, the network service fault diagnosis report according to the root fault, the pseudo fault, and the handling policy.

With reference to the fourth implementation manner of the fifth aspect of the embodiments, in a fifth implementation manner of the fifth aspect of the embodiments, the determining, by the SMS, a root fault and a pseudo fault with reference to the operating performance data of the VNF and the network service fault association response includes: searching, by the SMS, a data fault information list with reference to anomaly data in the operating performance data of the VNF and fault information in the network service fault association response, so as to obtain the corresponding root fault and the corresponding pseudo fault.

With reference to any implementation manner of the fifth aspect to the fifth implementation manner of the fifth aspect of the embodiments, in a sixth implementation manner of the fifth aspect of the embodiments, the network service fault association request information includes: a network service identifier and network service performance anomaly data, where the network service identifier is used to uniquely identify a network service in a network, and the network service performance anomaly data is used to indicate statistical data of one or several performance anomalies of a network service.

With reference to the sixth implementation manner of the fifth aspect of the embodiments, in a seventh implementation manner of the fifth aspect of the embodiments, the network service fault association response includes: the network service identifier, the fault information, and a fault type, where the fault information is used to identify an entity in which a fault occurs, and the fault type is used to identify a type of the fault.

With reference to the seventh implementation manner of the fifth aspect of the embodiments, in an eighth implementation manner of the fifth aspect, the network service fault diagnosis report includes: the network service identifier, the root fault, and a root fault handling decision, where the root fault is used to indicate a root of a network service anomaly, and the root fault handling decision is used to indicate a policy that handles the root fault.

With reference to any implementation manner of the fifth aspect to the fifth implementation manner of the fifth aspect of the embodiments, in a ninth implementation manner of the fifth aspect of the embodiments, the system management module is: a network management system NMS and/or a virtualized network function manager VNFM.

A sixth aspect of the embodiments provides a network service fault handling method, including: receiving, by a system management module, network service fault association request information sent by a service management system SMS; querying, by the system management module, fault information within a management scope of the system management module according to the network service fault association request information; converting, by the system management module, the fault information into a network service fault association response; sending, by the system management module, the network service fault association response to the SMS; receiving, by the system management module, a network service fault diagnosis report sent by the SMS, where the network service fault diagnosis report is obtained after the SMS performs fault diagnosis according to the network service fault association response and operating performance data of a virtual network function entity VNF; and performing, by the system management module, fault recovery according to the network service fault diagnosis report.

With reference to the sixth aspect of the embodiments, in a first implementation manner of the sixth aspect of the embodiments, when the system management module is a network management system NMS, the querying fault information within a management scope of the system management module includes: querying, by the NMS, fault information of a device managed by the NMS.

With reference to the sixth aspect of the embodiments, in a second implementation manner of the sixth aspect of the embodiments, when the system management module is a virtualized network function manager VNFM, the querying fault information within a management scope of the system management module includes: querying, by the VNFM, fault information of a VNF that is associated with a network service requested by the network service fault association request information; and querying, by the VNFM by using a virtualized infrastructure manager VIM, fault information of a network functions virtualization infrastructure NFVI associated with the network service; and the converting, by the system management module, the fault information into a network service fault association response includes: converting, by the VNFM, the fault information of the VNF and the fault information of the NFVI into the network service fault association response.

It may be learned from the foregoing technical solutions that, the embodiments have the following advantages: In the embodiments, after detecting that operating performance data of a VNF is abnormal, a service management system SMS sends network service association request information to a system management module, and the system management module queries a fault and feeds back a network service fault association response; the SMS then performs fault diagnosis according to the network service fault association response and the operating performance data of the VNF, so as to obtain a network service fault diagnosis report, and sends the network service fault diagnosis report to the system management module, and the system management module can perform fault recovery according to the network service fault diagnosis report. In this way, handling of a network service fault is implemented in an NFV environment; when a fault occurs in a network service, the fault can be quickly discovered and resolved, ensuring stability of an NFV system, and improving operating efficiency of the NFV system.

BRIEF DESCRIPTION OF THE DRAWINGS

FIG. 3 is another schematic structural diagram of a service management system according to;

DETAILED DESCRIPTION OF ILLUSTRATIVE EMBODIMENTS

The following clearly and completely describes the technical solutions in the embodiments with reference to the accompanying drawings in the embodiments. Apparently, the described embodiments are merely some but not all of the embodiments. All other embodiments obtained by persons skilled in the art based on the embodiments without creative efforts shall fall within the protection scope of the embodiments.

Figure 1:
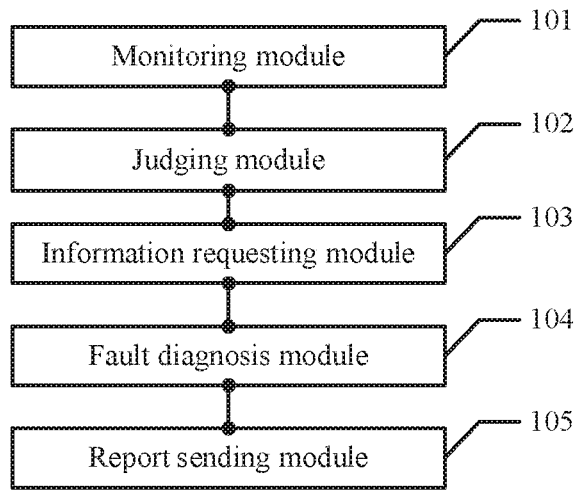
FIG. 1 is a schematic structural diagram of a service management system according to an embodiment.

Referring to FIG. 1, an embodiment of a service management system in the embodiments includes a monitoring module 101, configured to monitor operating performance data of a virtual network function entity VNF and a judging module 102, configured to determine, according to the operating performance data that is of the VNF and monitored by the monitoring module 101, whether network service performance is abnormal. The service management system also includes an information requesting module 103, configured to: when the judging module 102 determines that the network service performance is abnormal, send network service fault association request information to a system management module, where the network service fault association request information is used by the system management module to query a fault and feed back a network service fault association response to a fault diagnosis module 104. Additionally, the service management system includes the fault diagnosis module 104, configured to perform fault diagnosis according to the network service fault association response and the operating performance data of the VNF, so as to obtain a network service fault diagnosis report and a report sending module 105, configured to send the network service fault diagnosis report obtained by the fault diagnosis module 104 to the system management module, where the network service fault diagnosis report is used by the system management module to perform fault recovery.

In this embodiment, after a judging module 102 determines that operating performance data that is of a VNF and monitored by a monitoring module 101 is abnormal, an information requesting module 103 sends network service association request information to a system management module, and the system management module queries a fault and feeds back a network service fault association response; a fault diagnosis module 104 then performs fault diagnosis according to the network service fault association response and the operating performance data of the VNF, so as to obtain a network service fault diagnosis report; a report sending module 105 sends the network service fault diagnosis report to the system management module, and the system management module can perform fault recovery according to the network service fault diagnosis report. In this way, handling of a network service fault is implemented in an NFV environment; when a fault occurs in a network service, the fault can be quickly discovered and resolved, ensuring stability of an NFV system, and improving operating efficiency of the NFV system.

Figure 2:
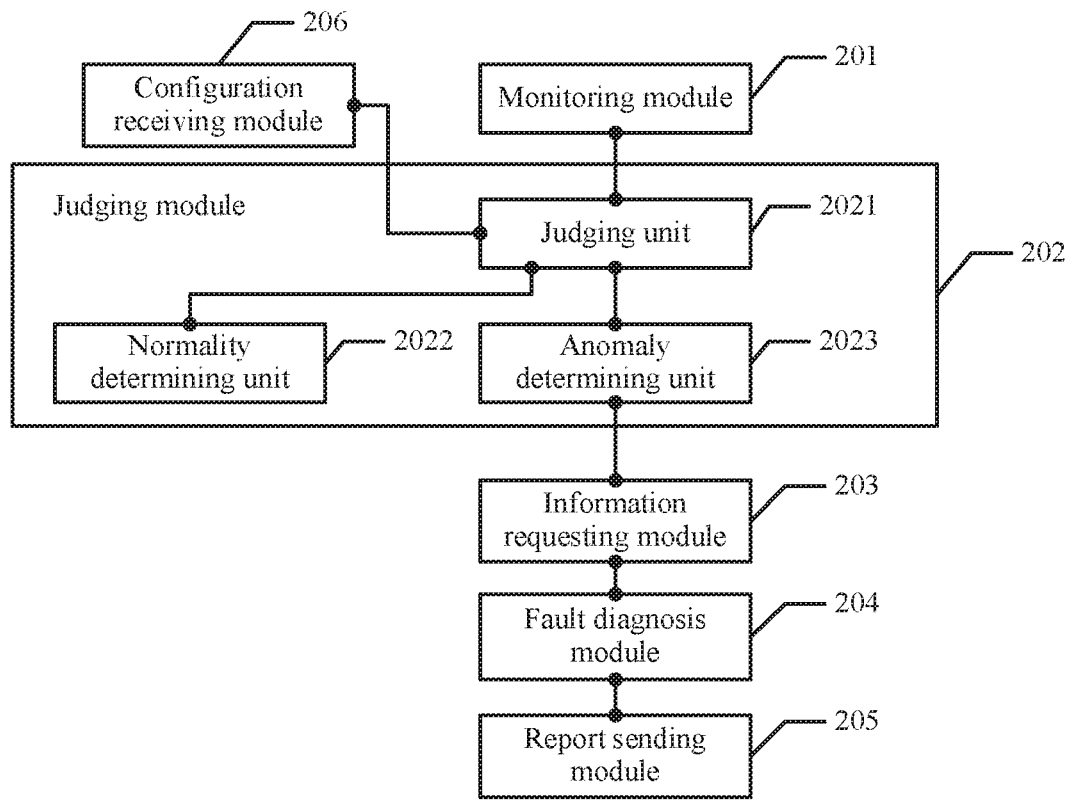
FIG. 2 is another schematic structural diagram of a service management system according to an embodiment.

In the foregoing embodiment, the monitoring module 101 monitors the operating performance data of the VNF, and the judging module 102 determines, according to the operating performance data of the VNF, whether network service performance is abnormal. In an actual application, the monitoring module 101 may receive the operating performance data that is of the VNF and sent by an element management system EMS, the SMS may further receive a configuration parameter value range sent by an orchestrator, and the judging module 102 determines, according to the configuration parameter value range and the operating performance data of the VNF, whether the network service performance is abnormal. The following specifically describes a service management system in an embodiment. Referring to FIG. 2, another embodiment of a service management system in the embodiments include: a monitoring module 201, configured to monitor operating performance data of a virtual network function entity VNF; a judging module 202, configured to determine, according to the operating performance data that is of the VNF and monitored by the monitoring module 201, whether network service performance is abnormal; an information requesting module 203, configured to: when the judging module 202 determines that the network service performance is abnormal, send network service fault association request information to a system management module, where the network service fault association request information is used by the system management module to query a fault and feed back a network service fault association response to a fault diagnosis module 204; the fault diagnosis module 204, configured to perform fault diagnosis according to the network service fault association response and the operating performance data of the VNF, so as to obtain a network service fault diagnosis report; and a report sending module 205, configured to send the network service fault diagnosis report obtained by the fault diagnosis module 204 to the system management module, where the network service fault diagnosis report is used by the system management module to perform fault recovery.

In this embodiment, the monitoring module 201 is specifically configured to periodically receive the operating performance data that is of the VNF and sent by an element management system EMS.

The service management system may further include: a configuration receiving module 206, configured to receive a configuration parameter value range sent by an orchestrator; where the judging module 202 specifically includes: a judging unit 2021, configured to determine whether the operating performance data of the VNF falls within the configuration parameter value range received by the configuration receiving module 206; a normality determining unit 2022, configured to: when the judging unit 2021 determines that the operating performance data of the VNF falls within the configuration parameter value range, determine that the network service performance is normal; and an anomaly determining unit 2023, configured to: when the judging unit 2021 determines that the operating performance data of the VNF falls outside the configuration parameter value range, determine that the network service performance is abnormal.

In this embodiment, a configuration receiving module 206 may first receive a configuration parameter value range, and a judging module 202 determines, according to the configuration parameter value range and operating performance data of a VNF, whether network service performance is abnormal, so that determining of the network service performance is more accurate; when it is determined that the network service performance is normal, a step of receiving the operating performance data of the VNF is triggered, improving continuity of fault monitoring, and ensuring timeliness of fault handling.

Figure 3:
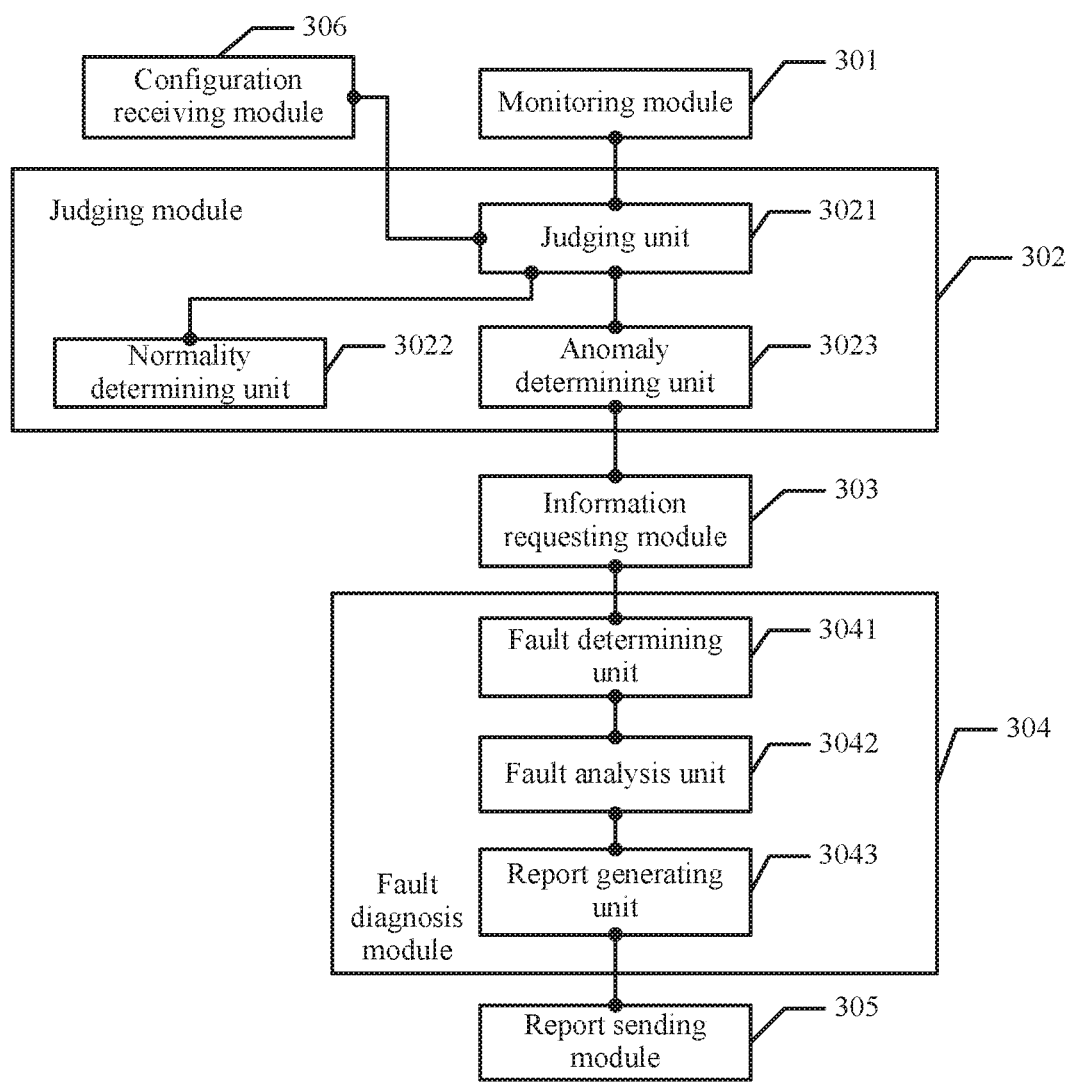

In the foregoing embodiment, a fault diagnosis module 204 performs fault diagnosis according to a network service fault association response and the operating performance data of the VNF, so as to obtain a network service fault diagnosis report. In an actual application, the fault diagnosis module 204 may first determine a root fault and a pseudo fault with reference to the network service fault association response and the operating performance data of the VNF and then perform subsequent handling. The following describes in detail a service management system in an embodiment. Referring to FIG. 3, another embodiment of a service management system in the embodiments include: a monitoring module 301, configured to monitor operating performance data of a virtual network function entity VNF; a judging module 302, configured to determine, according to the operating performance data that is of the VNF and monitored by the monitoring module 301, whether network service performance is abnormal; an information requesting module 303, configured to: when the judging module 302 determines that the network service performance is abnormal, send network service fault association request information to a system management module, where the network service fault association request information is used by the system management module to query a fault and feed back a network service fault association response to a fault diagnosis module 304; the fault diagnosis module 304, configured to perform fault diagnosis according to the network service fault association response and the operating performance data of the VNF, so as to obtain a network service fault diagnosis report; and a report sending module 305, configured to send the network service fault diagnosis report obtained by the fault diagnosis module 304 to the system management module, where the network service fault diagnosis report is used by the system management module to perform fault recovery.

The monitoring module 301 is specifically configured to periodically receive the operating performance data that is of the VNF and sent by an element management system EMS.

The service management system may further include: a configuration receiving module 306, configured to receive a configuration parameter value range sent by an orchestrator; where the judging module 302 specifically includes: a judging unit 3021, configured to determine whether the operating performance data of the VNF falls within the configuration parameter value range received by the configuration receiving module 306; a normality determining unit 3022, configured to: when the judging unit 3021 determines that the operating performance data of the VNF falls within the configuration parameter value range, determine that the network service performance is normal; and an anomaly determining unit 3023, configured to: when the judging unit 3021 determines that the operating performance data of the VNF falls outside the configuration parameter value range, determine that the network service performance is abnormal.

In this embodiment, the fault diagnosis module 304 specifically includes: a fault determining unit 3041, configured to determine a root fault and a pseudo fault with reference to the operating performance data that is of the VNF and monitored by the monitoring module and the network service fault association response, where the pseudo fault is a fault that can be resolved along with recovery of the root fault; a fault analysis unit 3042, configured to perform analysis on the root fault and the pseudo fault that are determined by the fault determining unit 3041, so as to obtain a handling policy; and a report generating unit 3043, configured to generate the network service fault diagnosis report according to the root fault, the pseudo fault, and the handling policy that is obtained by means of analysis by the fault analysis unit 3042.

The fault determining unit 3041 may be specifically configured to search a data fault information list with reference to anomaly data in the operating performance data that is of the VNF and monitored by the monitoring module 301 and fault information in the network service fault association response, so as to obtain the corresponding root fault and the corresponding pseudo fault, where the pseudo fault is the fault that can be resolved along with the recovery of the root fault.

The network service fault association request information includes a network service identifier, where the network service identifier is used to uniquely identify a network service in a network, or may include network service performance anomaly data, where the network service performance anomaly data is used to indicate statistical data of one or several performance anomalies of a network service, or may include topology information of a network service or a time at which a network service anomaly occurs, where the topology information of the network service is used to indicate all network devices or network functions that are included in the network service, and the time at which the network service anomaly occurs is used to indicate a time at which a fault occurs, or may include other data related to a network service, which is not limited herein.

The network service association response includes the network service identifier and the fault information, where the fault information is used to identify an entity in which a fault occurs, which may differentiate which part in a management scope of the system management module is faulty. The network service association response may further include a fault type used to identify a type of the fault, for example, overload, service suspension, or power-off. The network service association response may further include other data related to the network service or the fault, such as the topology information of the network service, the network service performance anomaly data, or the time at which the network service anomaly occurs, which is not limited herein.

The network service fault diagnosis report includes the network service identifier, the root fault, and a root fault handling decision, where the root fault is used to indicate a root of a network service anomaly, and the root fault handling decision is used to indicate a policy that handles the root fault, such as restart and migration. The network service fault diagnosis report may further include a root fault type, the pseudo fault, a pseudo fault type, or a pseudo fault handling decision. The network service fault diagnosis report may further include other data related to the network service or the fault, such as the topology information of the network service, the network service performance anomaly data, or the time at which the network service anomaly occurs, which is not limited herein.

In this embodiment, a fault determining unit 3041 first determines a root fault and a pseudo fault with reference to a network service fault association response and operating performance data of a VNF, a fault analysis unit 3042 then performs analysis on the root fault and the pseudo fault so as to obtain a handling policy, and a report generating unit 3043 then generates a network service fault diagnosis report according to the root fault, the pseudo fault, and the handling policy and sends the network service fault diagnosis report to a system management module, so that analysis on a network service fault is more accurate and accuracy of fault handling is improved.

It may be understood that, the service management system SMS may be deployed in different management systems, for example, the SMS may be deployed in the element management system EMS, or may be deployed in the orchestrator, or may be deployed in an NMS or a VNFM in the system management module, which is not limited herein. When the SMS is deployed in a different management system, a path for receiving or sending various messages may be different; for example, when the SMS is deployed in the NMS in the system management module, the SMS may transmit various messages by using the Orchestrator.

For ease of understanding of the foregoing embodiment, the following describes an interaction process of the foregoing units of the service management system in a specific application scenario.

The configuration receiving module 306 receives a configuration parameter value range sent by an Orchestrator; the monitoring module 301 receives, at intervals of 10 seconds, operating performance data that is of a VNF and sent by the EMS; the judging unit 3021 determines that service performance of VNF-4 in the operating performance data of the VNF exceeds the configuration parameter value range, and the anomaly determining unit 3023 determines that network service performance of VNF-4 is abnormal; the information requesting module 303 sends network service fault association request information to the system management module, where the network service fault association request information includes a network identifier and network service performance anomaly data that are of VNF-4, and the network service fault association request information is used by the system management module to query a fault and feed back a network service fault association response to the fault determining unit 3041; the fault determining unit 3041 determines, with reference to the operating performance data of the VNF and the network service fault association response (where the network service fault association response includes: a device GW2 is faulty, and throughput is 0; a device GW1 is normal, and service performance is overloaded; VNF-4 is normal, and service performance is overloaded), that a fault in the device GW2 is a root fault, and faults in the device GW1 and VNF-4 are pseudo faults; the fault analysis unit 3042 analyzes the root fault and the pseudo faults and obtains a handling policy that is to restart the device GW2; the report generating unit 3043 generates a network service fault diagnosis report according to the root fault, the pseudo faults, and the handling policy, where the network service fault diagnosis report includes that the root fault is the fault in the GW2, and a root fault handling decision is to restart the GW2; and the report sending module 305 sends the network service fault diagnosis report to the system management module, where the network service fault diagnosis report is used by the system management module to perform fault recovery.

Figure 4:
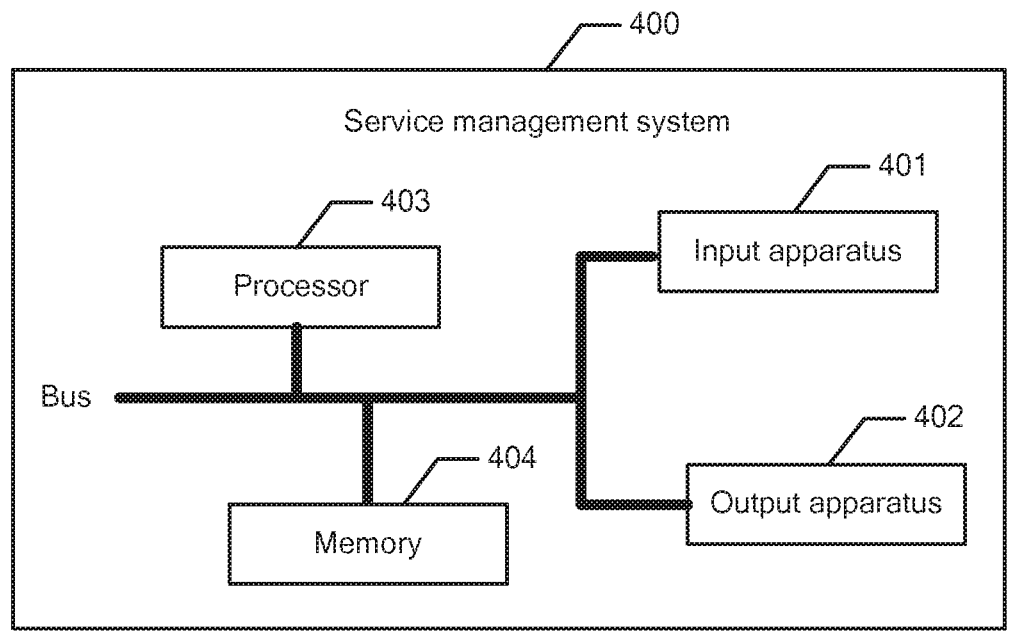
FIG. 4 is another schematic structural diagram of a service management system according to an embodiment.

The foregoing describes the service management system in this embodiment from the perspective of a cellular functional entity, and the following describes a service management system in an embodiment from the perspective of hardware processing. Referring to FIG. 4, another embodiment of a service management system 400 in an embodiment include: an input apparatus 401, an output apparatus 402, a processor 403, and a memory 404 (where a quantity of processors 403 in the service management system may be one or more, and one processor 403 is used as an example in FIG. 4). In some embodiments, the input apparatus 401, the output apparatus 402, the processor 403, and the memory 404 may be connected by using a bus or in another manner. That a connection is implemented by using a bus is used as an example in FIG. 4; where: the processor 403 is configured to perform, by invoking an operation instruction stored in the memory 404, the following steps: monitoring operating performance data of a virtual network function entity VNF; determining, according to the operating performance data of the VNF, whether network service performance is abnormal; when the network service performance is abnormal, sending network service fault association request information to a system management module, where the network service fault association request information is used by the system management module to query a fault and feed back a network service fault association response; performing fault diagnosis according to the network service fault association response and the operating performance data of the VNF, so as to obtain a network service fault diagnosis report; and sending the network service fault diagnosis report to the system management module, where the network service fault diagnosis report is used by the system management module to perform fault recovery.

In some embodiments, the processor 403 specifically performs the following operation: periodically receiving the operating performance data that is of the VNF and sent by an element management system EMS.

In some embodiments, the processor 403 specifically performs the following operations: receiving a configuration parameter value range sent by an orchestrator; determining whether the operating performance data of the VNF falls within the configuration parameter value range; when the operating performance data of the VNF falls within the configuration parameter value range, determining that the network service performance is normal; and when the operating performance data of the VNF falls outside the configuration parameter value range, determining that the network service performance is abnormal.

In some embodiments, the processor 403 specifically performs the following operations: determining a root fault and a pseudo fault with reference to the operating performance data of the VNF and the network service fault association response, where the pseudo fault is a fault that can be resolved along with recovery of the root fault; performing analysis on the root fault and the pseudo fault, so as to obtain a handling policy; and generating the network service fault diagnosis report according to the root fault, the pseudo fault, and the handling policy.

In some embodiments, the processor 403 specifically performs the following operation: searching a data fault information list with reference to anomaly data in the operating performance data of the VNF and fault information in the network service fault association response, so as to obtain the corresponding root fault and the corresponding pseudo fault.

Figure 5:
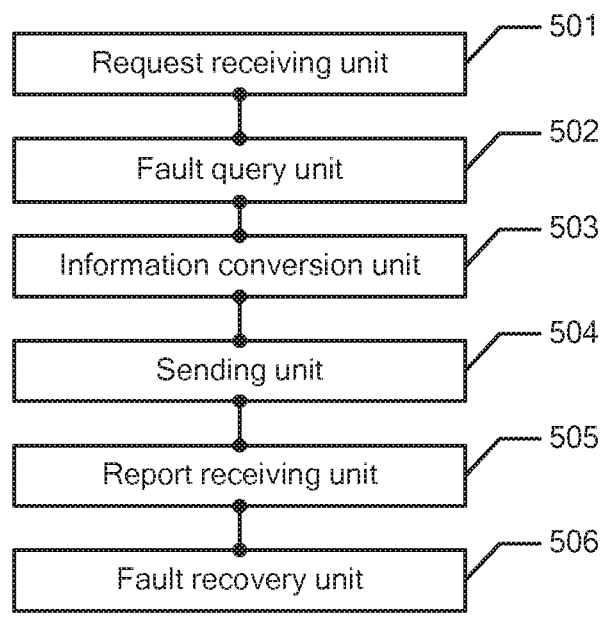
FIG. 5 is a schematic structural diagram of a system management module according to an embodiment.

The following describes a system management module in an embodiment. Referring to FIG. 5, an embodiment of a system management module in the includes: a request receiving unit 501, configured to receive network service fault association request information sent by a service management system SMS; a fault query unit 502, configured to query fault information within a management scope according to the network service fault association request information received by the request receiving unit 501; an information conversion unit 503, configured to convert the fault information queried by the fault query unit 502 into a network service fault association response; a sending unit 504, configured to send, to the SMS, the network service fault association response obtained by means of conversion by the information conversion unit 503; a report receiving unit 505, configured to receive a network service fault diagnosis report sent by the SMS, where the network service fault diagnosis report is obtained after the SMS performs fault diagnosis according to the network service fault association response sent by the sending unit 504 and operating performance data of a virtual network function entity VNF; and a fault recovery unit 506, configured to perform fault recovery according to the network service fault diagnosis report received by the report receiving unit 505.

In this embodiment, a fault query unit 502 queries fault information according to network service fault association request information received by a request receiving unit 501; after an information conversion unit 503 converts the fault information into a network service fault association response, a sending unit 504 sends the network service fault association response to an SMS, and then a fault recovery unit 506 performs fault recovery according to a network service fault diagnosis report sent by the SMS. In this way, handling of a network service fault is implemented in an NFV environment; when a fault occurs in a network service, the fault can be quickly found and handled, ensuring stability of an NFV system, and improving operating efficiency of the NFV system.

Figure 6:
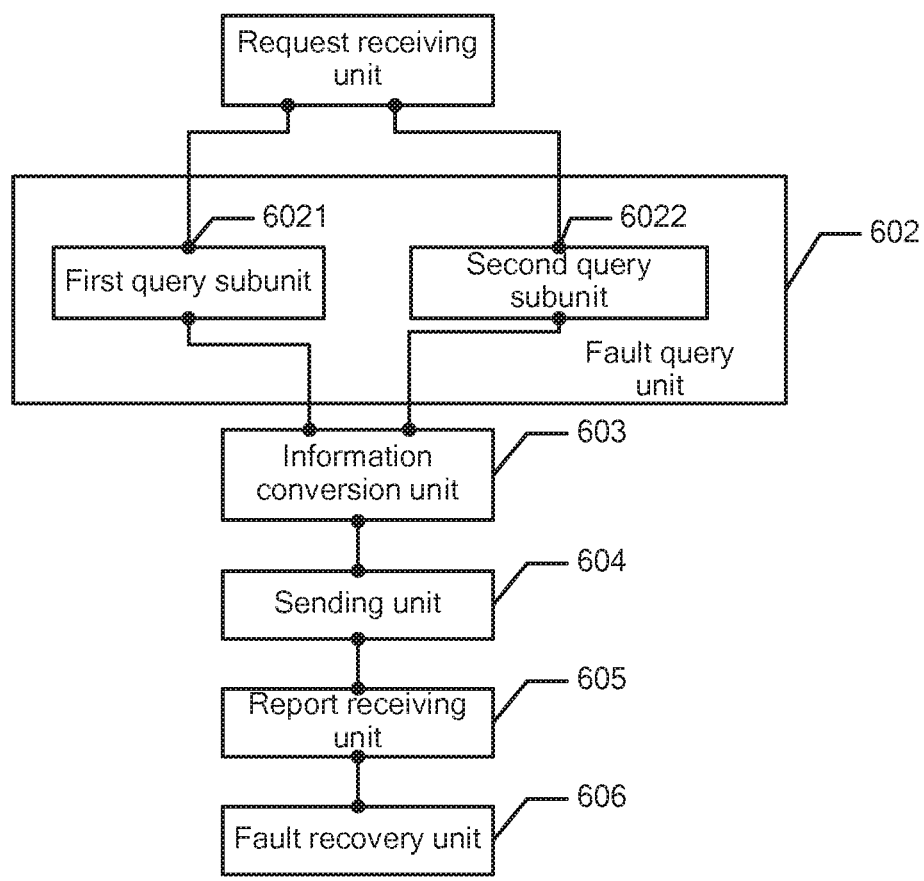
FIG. 6 is another schematic structural diagram of a system management module according to an embodiment.

In an actual application, the system management module may be a network management system NMS, or may be a virtualized network function manager VNFM, or may be a combination of an NMS and a VNFM. Referring to FIG. 6, another embodiment of a system management module in the embodiments include: a request receiving unit 601, configured to receive network service fault association request information sent by a service management system SMS; a fault query unit 602, configured to query fault information within a management scope according to the network service fault association request information received by the request receiving unit 601; an information conversion unit 603, configured to convert the fault information queried by the fault query unit 602 into a network service fault association response; a sending unit 604, configured to send, to the SMS, the network service fault association response obtained by means of conversion by the information conversion unit 603; a report receiving unit 605, configured to receive a network service fault diagnosis report sent by the SMS, where the network service fault diagnosis report is obtained after the SMS performs fault diagnosis according to the network service fault association response sent by the sending unit 604 and operating performance data of a virtual network function entity VNF; and a fault recovery unit 606, configured to perform fault recovery according to the network service fault diagnosis report received by the report receiving unit 605.

In this embodiment, when the system management module is a network management system NMS, the fault query unit 602 is specifically configured to query, according to the network service fault association request information received by the request receiving unit, fault information of a device that is managed.

When the system management module is a virtualized network function manager VNFM, the fault query unit 602 specifically includes: a first query subunit 6021, configured to query, according to the network service fault association request information received by the request receiving unit 601, fault information of a VNF that is associated with a network service requested by the network service fault association request information; and a second query subunit 6022, configured to query, by using a virtualized infrastructure manager VIM and according to the network service fault association request information received by the request receiving unit 601, fault information of a network functions virtualization infrastructure NFVI associated with the network service; where the information conversion unit 603 is specifically configured to convert the fault information of the VNF and the fault information of the NFVI into the network service fault association response.

In this embodiment, when a system management module is a VNFM, after a request receiving unit 601 receives network service fault association response information, a first query subunit 6021 may query fault information of a VNF, a second query subunit 6022 may query fault information of an NFVI by using a VIM, and then an information conversion unit 603 converts the fault information of the VNF and the fault information of the NFVI into a network service fault association response. In this way, compared with querying faults of the VNF and the NFVI in another manner, performing a fault query on the VNF and the NFVI by using the virtualized network function manager VNFM can obtain fault information more quickly, which improves efficiency of querying a fault.

For ease of understanding of the foregoing embodiment, the following describes an interaction process of the foregoing units of the system management module in a specific application scenario:

The request receiving unit 601 receives network service fault association request information sent by the SMS, where the network service fault association request information includes that VNF-4 is overloaded; the first query subunit 6021 queries, according to the network service fault association request information, fault information that is of a VNF and associated with VNF-4, and learns that: VNF-2 is normal, and service performance is overloaded; VNF-4 is normal, and service performance is overloaded; the second query subunit 6022 queries, by using the VIM, fault information that is of an NFVI and associated with VNF-4, and learns that the NFVI is faulty and throughput is 0; the information conversion unit 603 converts the fault information of the VNF (VNF-2 is normal, and service performance is overloaded; VNF-4 is normal, and service performance is overloaded) and the fault information of the NFVI (the NFVI is faulty and the throughput is 0) into a network service fault association response; the sending unit 604 sends the network service fault management response to the SMS; the report receiving unit 605 receives a network service fault diagnosis report sent by the SMS, where the network service fault diagnosis report includes that a root fault is a fault in the NFVI, a root fault handling decision is to restart the NFVI, and pseudo faults are faults in VNF-1 and VNF-4; and the fault recovery unit 606 restarts the NFVI according to the network service fault diagnosis report.

Figure 7:
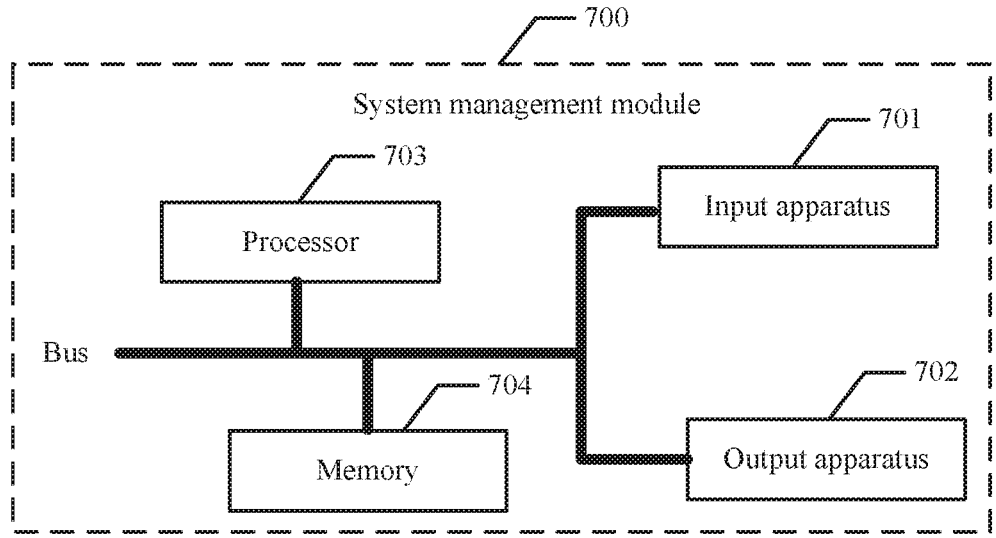
FIG. 7 is another schematic structural diagram of a system management module according to an embodiment.

The foregoing describes the system management module in this embodiment from the perspective of a cellular functional entity, and the following describes a system management module in an embodiment from the perspective of hardware processing. Referring to FIG. 7, another embodiment of a system management module 700 in the embodiments include: an input apparatus 701, an output apparatus 702, a processor 703, and a memory 704 (where a quantity of processors 703 in a service management system may be one or more, and one processor 703 is used as an example in FIG. 7). In some embodiments, the input apparatus 701, the output apparatus 702, the processor 703, and the memory 704 may be connected by using a bus or in another manner. That a connection is implemented by using a bus is used as an example in FIG. 7; where: the processor 703 is configured to perform, by invoking an operation instruction stored in the memory 704, the following steps: receiving network service fault association request information sent by a service management system SMS; querying fault information within a management scope according to the network service fault association request information; converting the fault information into a network service fault association response; sending the network service fault association response to the SMS; receiving a network service fault diagnosis report sent by the SMS, where the network service fault diagnosis report is obtained after the SMS performs fault diagnosis according to the network service fault association response and operating performance data of a virtual network function entity VNF; and performing fault recovery according to the network service fault diagnosis report.

In some embodiments, when the system management module is a network management system NMS, the processor 703 specifically performs the following operation: querying fault information of a device that is managed.

In some embodiments, when the system management module is a virtualized network function manager VNFM, the processor 703 specifically performs the following operations: querying fault information of a VNF that is associated with a network service requested by the network service fault association request information; querying, by using a virtualized infrastructure manager VIM, fault information of a network functions virtualization infrastructure NFVI associated with the network service; and converting the fault information of the VNF and the fault information of the NFVI into the network service fault association response.

Figure 8:
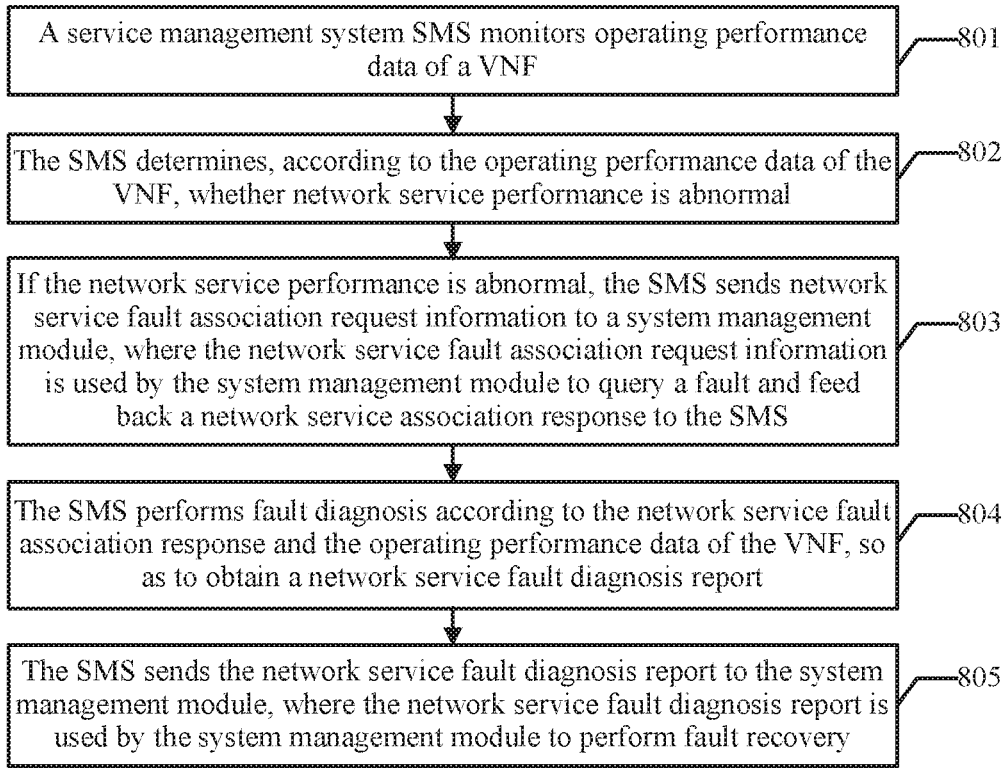
FIG. 8 is a schematic flowchart of a network service fault handling method according to an embodiment.

The following describes a network service fault handling method in an embodiment. Referring to FIG. 8, an embodiment of a network service fault handling method in the embodiments includes.

801. An SMS monitors operating performance data of a VNF.

When an NFV system is running, the service management system SMS monitors the operating performance data of the virtual network function entity VNF.

802. The SMS determines, according to the operating performance data of the VNF, whether network service performance is abnormal.

After obtaining the operating performance data of the VNF by means of monitoring, the SMS determines, according to the performance data of the VNF, whether the network service performance is abnormal.

803. If the network service performance is abnormal, the SMS sends network service fault association request information to a system management module.

When the SMS determines that the network service performance is abnormal, the SMS sends the network service fault association request information to the system management module, where the network service fault association request information is used by the system management module to query a fault and feed back a network service association response to the SMS.

804. The SMS performs fault diagnosis according to a network service fault association response and the operating performance data of the VNF, so as to obtain a network service fault diagnosis report.

After receiving the network service association response fed back by the system management module, the SMS performs the fault diagnosis according to the network service fault association response and the operating performance data of the VNF, so as to obtain the network service fault diagnosis report.

805. The SMS sends the network service fault diagnosis report to the system management module.

After performing the fault diagnosis and obtaining the network service fault diagnosis report, the SMS sends the network service fault diagnosis report to the system management module, where the network service fault diagnosis report is used by the system management module to perform fault recovery.

In this embodiment, after detecting that operating performance data of a VNF is abnormal, a service management system SMS sends network service association request information to a system management module, and the system management module queries a fault and feeds back a network service fault association response; the SMS then performs fault diagnosis according to the network service fault association response and the operating performance data of the VNF, so as to obtain a network service fault diagnosis report, and sends the network service fault diagnosis report to the system management module, and the system management module performs fault recovery according to the network service fault diagnosis report. In this way, handling of a network service fault is implemented in an NFV environment; when a fault occurs in a network service, the fault can be quickly discovered and resolved, ensuring stability of an NFV system, and improving operating efficiency of the NFV system.

Figure 9:
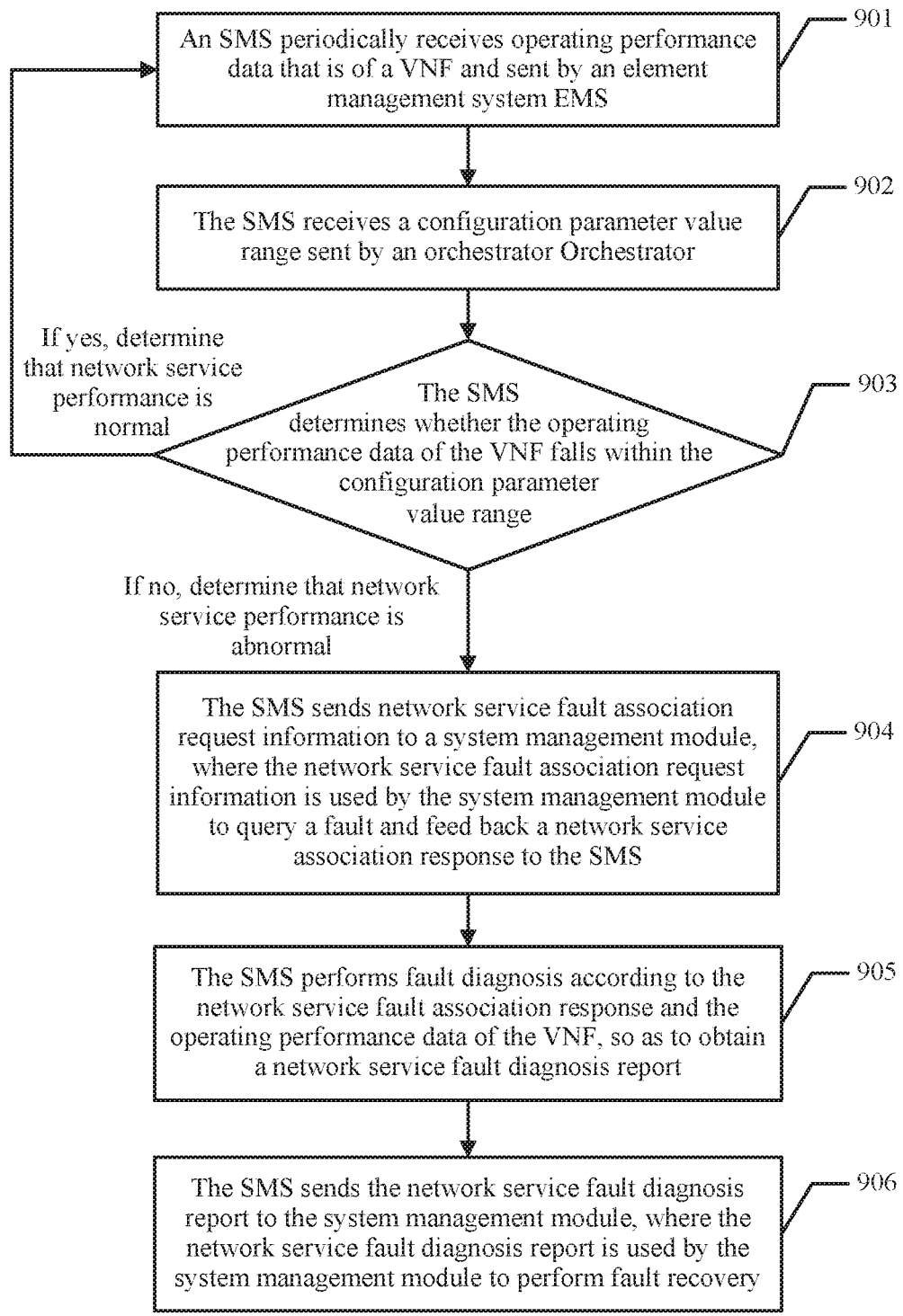
FIG. 9 is another schematic flowchart of a network service fault handling method according to an embodiment.

In the foregoing embodiment, the SMS monitors the operating performance data of the VNF, and determines, according to the operating performance data of the VNF, whether network service performance is abnormal. In an actual application, the SMS may receive the operating performance data that is of the VNF and sent by an element management system EMS, the SMS may further receive a configuration parameter value range sent by an orchestrator, and determines, according to the configuration parameter value range and the operating performance data of the VNF, whether the network service performance is abnormal. The following specifically describes a network service fault handling method in an embodiment. Referring to FIG. 9, another embodiment of a network service fault handling method in the embodiments include:

901. An SMS periodically receives operating performance data that is of a VNF and sent by an element management system EMS.

When an NFV system is running, the service management system SMS periodically receives the operating performance data that is of the VNF and sent by the element management system EMS.

It may be understood that, that the SMS periodically receives the operating performance data that is of the VNF and sent by the EMS may be that the EMS periodically detects the operating performance data of the VNF in an active manner and then sends the operating performance data to the SMS, or may be that the SMS periodically sends a data request to the EMS so that the EMS monitors the operating performance data of the VNF and then feeds back the operating performance data to the SMS, which is not limited herein.

A period of receiving the operating performance data of the VNF by the SMS may be set according to an actual situation; for example, one second may be used as the period, or one minute may be used as the period, which is not limited herein.

The operating performance data may be data throughput, a delay, or bandwidth, or may be a parameter that indicates data throughput, a delay, or bandwidth, or may be another parameter that describes a network service characteristic, which is not limited herein.

902. The SMS receives a configuration parameter value range sent by an orchestrator.

The SMS receives the configuration parameter value range sent by the Orchestrator, where the configuration parameter value range indicates a value range that is of the operating performance data of the VNF and that is used when a network service is running normally.

It may be understood that, in an actual application, step 202 may be performed at any time before step 203, which is not limited herein; further, if the configuration parameter value range is stored in the SMS, step 202 may also not be performed, which is not limited herein.

903. The SMS determines whether the operating performance data of the VNF falls within the configuration parameter value range.

After the SMS receives the operating performance data of the VNF and the configuration parameter value range, the SMS determines whether the operating performance data of the VNF falls within the configuration parameter value range.

If the SMS determines that the operating performance data of the VNF falls outside the configuration parameter value range, it is determined that network service performance is abnormal, and step 204 is triggered.

If the SMS determines that the operating performance data of the VNF falls within the configuration parameter value range, it is determined that the network service performance is normal, and step 201 may be triggered.

In an actual application, when the SMS determines that the operating performance data of the VNF falls within the configuration parameter value range, running may also first be suspended for a preset period of time, and then step 201 is triggered, which is not limited herein.

904. The SMS sends network service fault association request information to a system management module.

When the SMS determines that the operating performance data of the VNF falls outside the configuration parameter value range and therefore determines that the network service performance is abnormal, the SMS sends the network service fault association request information to the system management module, where the network service fault association request information is used by the system management module to query a fault and feed back a network service association response to the SMS.

905. The SMS performs fault diagnosis according to a network service fault association response and the operating performance data of the VNF, so as to obtain a network service fault diagnosis report.

After receiving the network service association response fed back by the system management module, the SMS performs the fault diagnosis according to the network service fault association response and the operating performance data of the VNF, so as to obtain the network service fault diagnosis report.

906. The SMS sends the network service fault diagnosis report to the system management module.

After performing the fault diagnosis and obtaining the network service fault diagnosis report, the SMS sends the network service fault diagnosis report to the system management module, where the network service fault diagnosis report is used by the system management module to perform fault recovery.

In this embodiment, an SMS may first receive a configuration parameter value range, and determines, according to the configuration parameter value range and operating performance data of a VNF, whether network service performance is abnormal, so that determining of the network service performance is more accurate; when it is determined that the network service performance is normal, a step of receiving the operating performance data of the VNF is triggered, improving continuity of fault monitoring, and ensuring timeliness of fault handling.

Figure 10:
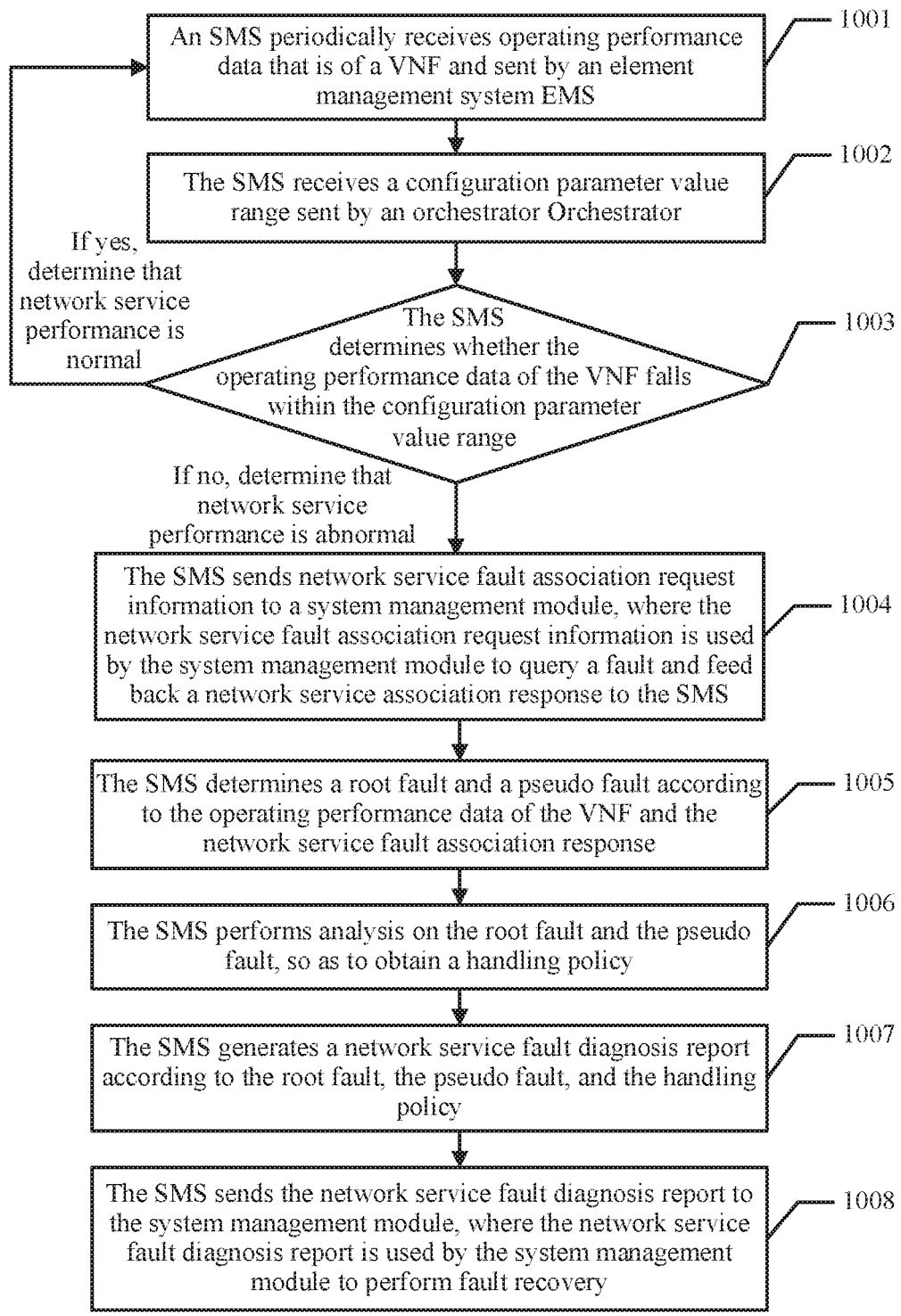
FIG. 10 is another schematic flowchart of a network service fault handling method according to an embodiment.

In the foregoing embodiment, the SMS performs fault diagnosis according to a network service fault association response and the operating performance data of the VNF, so as to obtain a network service fault diagnosis report. In an actual application, the SMS may first determine a root fault and a pseudo fault with reference to the network service fault association response and the operating performance data of the VNF and then perform subsequent handling. The following describes in detail a network fault handling method in an embodiment. Referring to FIG. 10, another embodiment of a network fault handling method in the embodiments include:

1001. An SMS periodically receives operating performance data that is of a VNF and sent by an element management system EMS.

When an NFV system is running, the service management system SMS periodically receives the operating performance data that is of the VNF and sent by the element management system EMS.

It may be understood that, that the SMS periodically receives the operating performance data that is of the VNF and sent by the EMS may be that the EMS periodically detects the operating performance data of the VNF in an active manner and then sends the operating performance data to the SMS, or may be that the SMS periodically sends a data request to the EMS so that the EMS monitors the operating performance data of the VNF and then feeds back the operating performance data to the SMS, which is not limited herein.

A period of receiving the operating performance data of the VNF by the SMS may be set according to an actual situation; for example, one second may be used as the period, or one minute may be used as the period, which is not limited herein.

The operating performance data may be data throughput, a delay, or bandwidth, or may be a parameter that indicates data throughput, a delay, or bandwidth, or may be another parameter that describes a network service characteristic, which is not limited herein.

1002. The SMS receives a configuration parameter value range sent by an orchestrator.

The SMS receives the configuration parameter value range sent by the Orchestrator, where the configuration parameter value range indicates a value range that is of the operating performance data of the VNF and that is used when a network service is running normally.

It may be understood that, in an actual application, step 1002 may be performed at any time before step 1003, which is not limited herein; further, if the configuration parameter value range is stored in the SMS, step 1002 may also not be performed, which is not limited herein.

1003. The SMS determines whether the operating performance data of the VNF falls within the configuration parameter value range.

After the SMS receives the operating performance data of the VNF and the configuration parameter value range, the SMS determines whether the operating performance data of the VNF falls within the configuration parameter value range.

If the SMS determines that the operating performance data of the VNF falls outside the configuration parameter value range, it is determined that network service performance is abnormal, and step 1004 is triggered.

If the SMS determines that the operating performance data of the VNF falls within the configuration parameter value range, it is determined that the network service performance is normal, and step 1001 may be triggered.

In an actual application, when the SMS determines that the operating performance data of the VNF falls within the configuration parameter value range, running may also first be suspended for a preset period of time, and then step 1001 is triggered, which is not limited herein.

1004. The SMS sends network service fault association request information to a system management module.

When the SMS determines that the operating performance data of the VNF falls outside the configuration parameter value range and therefore determines that the network service performance is abnormal, the SMS sends the network service fault association request information to the system management module, where the network service fault association request information is used by the system management module to query a fault and feed back a network service association response to the SMS.

The network service fault association request information includes a network service identifier, where the network service identifier is used to uniquely identify a network service in a network, or may include network service performance anomaly data, where the network service performance anomaly data is used to indicate statistical data of one or several performance anomalies of a network service, or may include topology information of a network service or a time at which a network service anomaly occurs, where the topology information of the network service is used to indicate all network devices or network functions that are included in the network service, and the time at which the network service anomaly occurs is used to indicate a time at which a fault occurs, or may include other data related to a network service, which is not limited herein.

According to different actual application situations, the system management module may be a network management system NMS, or may be a virtualized network function manager VNFM, or may include an NMS and a VNFM, which is not limited herein.

1005. The SMS determines a root fault and a pseudo fault according to the operating performance data of the VNF and a network service fault association response.

After receiving the network service association response fed back by the system management module, the SMS determines the root fault and the pseudo fault with reference to the operating performance data of the VNF and the network service fault association response, where the root fault is used to indicate a root of a network service anomaly, and the pseudo fault is a fault that can be resolved along with recovery of the root fault.

The network service association response includes the network service identifier and the fault information, where the fault information is used to identify an entity in which a fault occurs, which may differentiate which part in a management scope of the system management module is faulty. The network service association response may further include a fault type used to identify a type of the fault, for example, overload, service suspension, or power-off. The network service association response may further include other data related to the network service or the fault, such as the topology information of the network service, the network service performance anomaly data, or the time at which the network service anomaly occurs, which is not limited herein.

There are multiple methods for determining the root fault and the pseudo fault by the SMS, which may be searching a data fault information list so as to obtain the root fault and the pseudo fault that are corresponding to anomaly data in the operating performance data of the VNF and the fault information in the network service fault association response, or may be submitting the operating performance data of the VNF and the network service fault association response to an analysis tool so as to obtain the root fault and the pseudo fault by means of analysis, or may be another manner of determining the root fault and the pseudo fault, which is not limited herein. The data fault information list may be manually set, or may be obtained by importing empirical data, or may be updated by machine learning, which is not limited herein.

1006. The SMS performs analysis on the root fault and the pseudo fault, so as to obtain a handling policy.

After determining the root fault and the pseudo fault, the SMS performs analysis on the root fault and the pseudo fault, so as to obtain the handling policy.

1007. The SMS generates a network service fault diagnosis report according to the root fault, the pseudo fault, and the handling policy.

After obtaining the handling policy by means of analysis, the SMS generates the network service fault diagnosis report according to the root fault, the pseudo fault, and the handling policy.

The network service fault diagnosis report includes the network service identifier, the root fault, and a root fault handling decision, where the root fault is used to indicate a root of a network service anomaly, and the root fault handling decision is used to indicate a policy that handles the root fault, such as restart and migration. The network service fault diagnosis report may further include a root fault type, the pseudo fault, a pseudo fault type, or a pseudo fault handling decision. The network service fault diagnosis report may further include other data related to the network service or the fault, such as the topology information of the network service, the network service performance anomaly data, or the time at which the network service anomaly occurs, which is not limited herein.

1008. The SMS sends the network service fault diagnosis report to the system management module.

After generating the network service fault diagnosis report, the SMS sends the network service fault diagnosis report to the system management module, where the network service fault diagnosis report is used by the system management module to perform fault recovery.

After sending the network service fault diagnosis report to the system management module, the SMS may further receive a fault recovery message fed back by the system management module, where the fault message is used to indicate that the system management module has performed fault recovery; after receiving the fault recovery message and detecting that a fault has been resolved, the SMS may further feed back a network service fault recovery notification to the system management module, where the network service fault recovery notification is used to notify the system management module that the fault has been resolved.

In this embodiment, an SMS first determines a root fault and a pseudo fault with reference to a network service fault association response and operating performance data of a VNF, then performs analysis on the root fault and the pseudo fault so as to obtain a handling policy, and then generates a network service fault diagnosis report according to the root fault, the pseudo fault, and the handling policy and sends the network service fault diagnosis report to a system management module, so that analysis on a network service fault is more accurate and accuracy of fault handling is improved.

It may be understood that, the SMS may be deployed in different management systems, for example, the SMS may be deployed in the element management system EMS, or may be deployed in the orchestrator, or may be deployed in the NMS or the VNFM in the system management module, which is not limited herein. When the SMS is deployed in a different management system, a path for receiving or sending various messages may be different; for example, when the SMS is deployed in the NMS in the system management module, the SMS may transmit various messages by using the Orchestrator.

For ease of understanding, the following specifically describes the network service fault handling method in this embodiment by using a specific application scenario.

The SMS receives a configuration parameter value range sent by an Orchestrator; the SMS receives, at intervals of 10 seconds, operating performance data that is of a VNF and sent by the EMS; the SMS determines that service performance of VNF-4 in the operating performance data of the VNF exceeds the configuration parameter value range, and the SMS determines that network service performance of VNF-4 is abnormal; the SMS sends network service fault association request information to the system management module, where the network service fault association request information includes a network identifier and network service performance anomaly data that are of VNF-4, and the network service fault association request information is used by the system management module to query a fault and feed back a network service fault association response to the SMS; the SMS determines, with reference to the operating performance data of the VNF and the network service fault association response (where the network service fault association response includes: a device GW2 is faulty, and throughput is 0; a device GW1 is normal, and service performance is overloaded; VNF-4 is normal, and service performance is overloaded), that a fault in the device GW2 is a root fault, and faults in the device GW1 and VNF-4 are pseudo faults; the SMS analyzes the root fault and the pseudo faults and obtains a handling policy that is to restart the device GW2; the SMS generates a network service fault diagnosis report according to the root fault, the pseudo faults, and the handling policy, where the network service fault diagnosis report includes that the root fault is the fault in the GW2, and a root fault handling decision is to restart the GW2; and the SMS sends the network service fault diagnosis report to the system management module, where the network service fault diagnosis report is used by the system management module to perform fault recovery.

Figure 11:
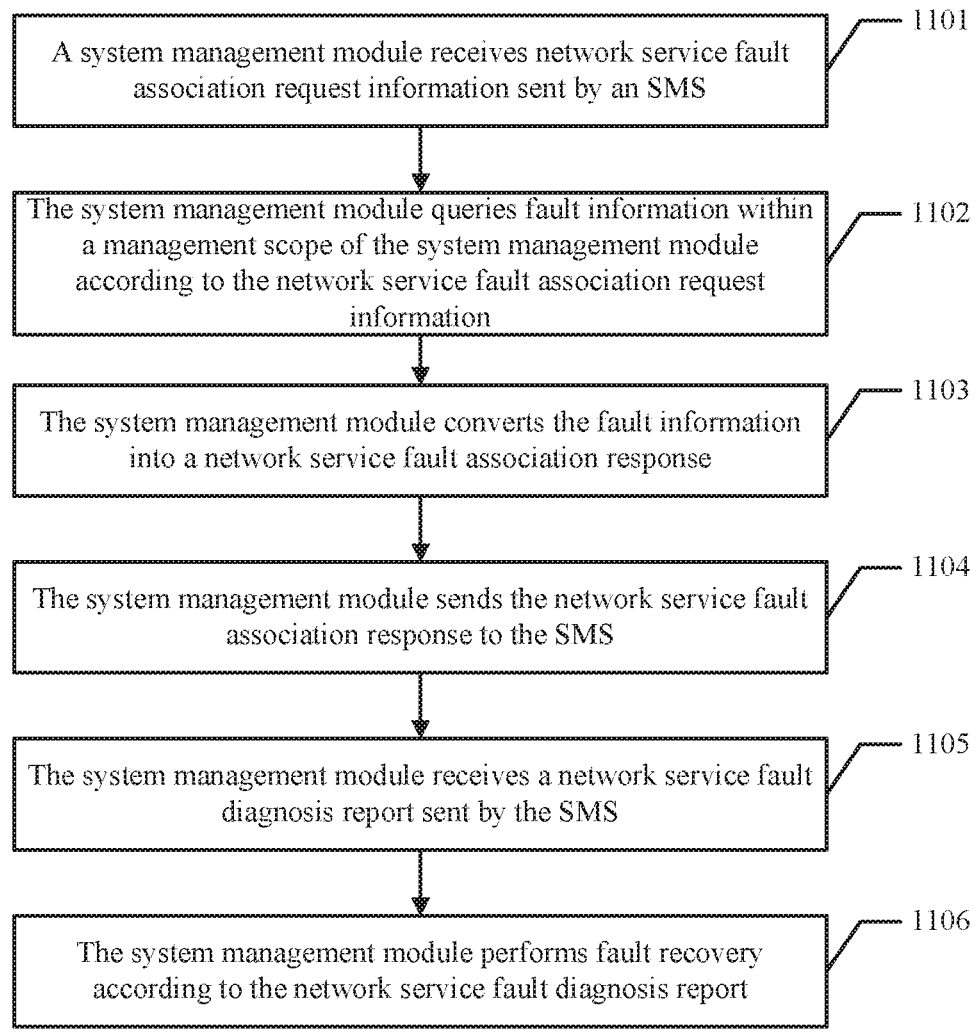
FIG. 11 is another schematic flowchart of a network service fault handling method according to an embodiment.

The following describes a network service fault handling method in an embodiment from the perspective of a system management module. Referring to FIG. 11, another embodiment of a network service fault handling method in the embodiments includes:

The system management module receives network service fault association request information sent by an SMS.

When the SMS sends the network service fault association request information to the system management module, the system management module receives the network service fault association request information sent by the SMS.

1102. The system management module queries fault information within a management scope of the system management module according to the network service fault association request information.

After receiving the network service fault association request information, the system management module queries the fault information within the management scope of the system management module according to the network service fault association request information.

1103. The system management module converts the fault information into a network service fault association response.

After finding the fault information, the system management module converts the fault information into the network service fault association response.

1104. The system management module sends the network service fault association response to the SMS.

After obtaining the network service fault management response, the system management module sends the network service fault association response to the SMS, where the network service fault association response is used by the SMS to perform fault analysis on a network service.

1105. The system management module receives a network service fault diagnosis report sent by the SMS.

When the SMS sends the network service fault diagnosis report to the system management module, the system management module receives the network service fault diagnosis report sent by the SMS, where the network service fault diagnosis report is obtained after the SMS performs fault diagnosis according to the network service fault association response and operating performance data of a virtual network function entity VNF.

1106. The system management module performs fault recovery according to the network service fault diagnosis report.

After obtaining the network service fault diagnosis report, the system management module performs fault recovery according to the network service fault diagnosis report.

In this embodiment, a system management module queries fault information according to received network service fault association request information, converts the fault information into a network service fault association response and sends the network service fault association response to an SMS, and then performs fault recovery according to a network service fault diagnosis report sent by the SMS. In this way, handling of a network service fault is implemented in an NFV environment; when a fault occurs in a network service, the fault can be quickly found and handled, ensuring stability of an NFV system, and improving operating efficiency of the NFV system.

In an actual application, the system management module may be a network management system NMS, or may be a virtualized network function manager VNFM, or may be a combination of an NMS and a VNFM. The following provides description by assuming that the system management module is the NMS or the VNFM separately.

Figure 12:
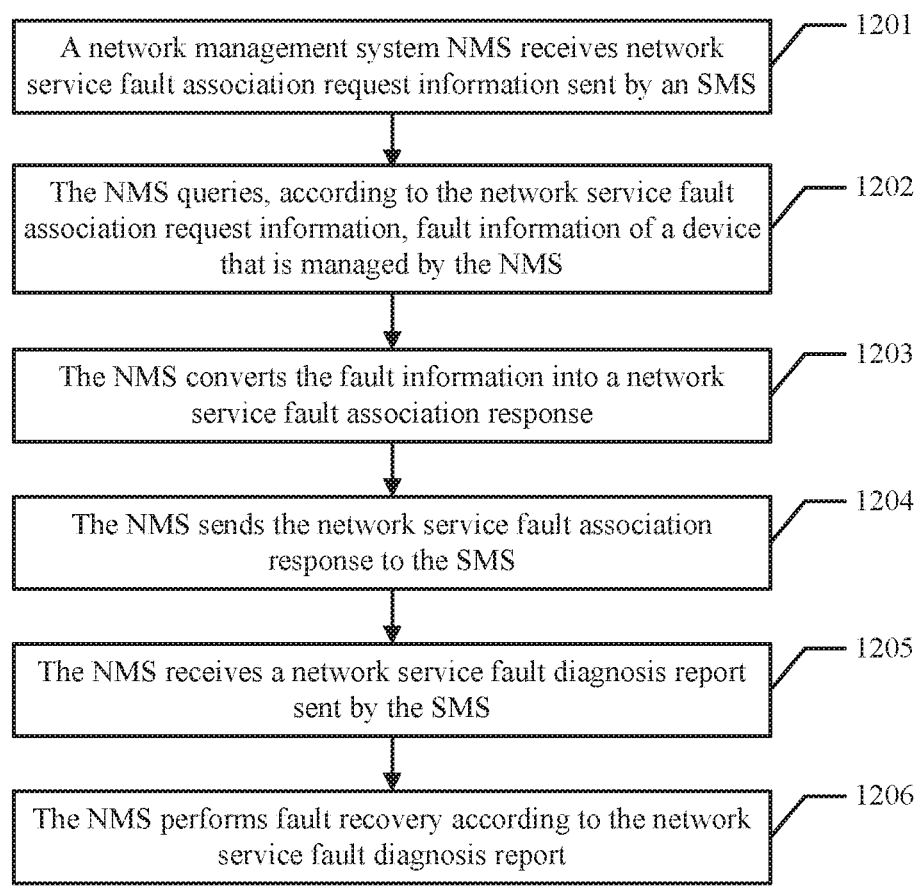
FIG. 12 is another schematic flowchart of a network service fault handling method according to an embodiment.

When the system management module is the NMS, referring to FIG. 12, another embodiment of a network service fault handling method in the embodiments include:

1201. The network management system NMS receives network service fault association request information sent by an SMS.

When the SMS sends the network service fault association request information to the NMS, the NMS receives the network service fault association request information sent by the SMS.

1202. The NMS queries, according to the network service fault association request information, fault information of a device that is managed by the NMS.

After receiving the network service fault association request information, the NMS queries, according to the network service fault association request information, the fault information of the device that is managed by the NMS.

1203. The NMS converts the fault information into a network service fault association response.

After finding the fault information of the device, the NMS converts the fault information into the network service fault association response.

1204. The NMS sends the network service fault association response to the SMS.

After obtaining the network service fault management response, the NMS sends the network service fault association response to the SMS, where the network service fault association response is used by the SMS to perform fault analysis on a network service.

1205. The NMS receives a network service fault diagnosis report sent by the SMS.

When the SMS sends the network service fault diagnosis report to the NMS, the NMS receives the network service fault diagnosis report sent by the SMS, where the network service fault diagnosis report is obtained after the SMS performs fault diagnosis according to the network service fault association response and operating performance data of a virtual network function entity VNF.

1206. The NMS performs fault recovery according to the network service fault diagnosis report.

After obtaining the network service fault diagnosis report, the NMS performs fault recovery according to the network service fault diagnosis report.

There are multiple methods for performing fault recovery by the NMS, which for example, may be restarting a device, or may be migrating a service, which is not limited herein.

In an actual application, after performing fault recovery, the NMS may feed back a fault recovery notification to the SMS, so as to notify the SMS that fault recovery has been performed; after receiving the fault recovery notification and when detecting that the fault has been resolved, the SMS may send a network service fault recovery notification to the NMS, so as to notify the NMS that the fault has been resolved.

In this embodiment, when a system management module is an NMS, after receiving network service fault association response information, the NMS may query fault information of a device managed by the NMS, and then convert the fault information into a network service fault association response and feed back the network service fault association response to an SMS. In this way, performing a fault query on the device by using the network management system NMS speeds up a fault query progress, so that a fault query result is more accurate, and efficiency of fault handling is improved.

Figure 13:
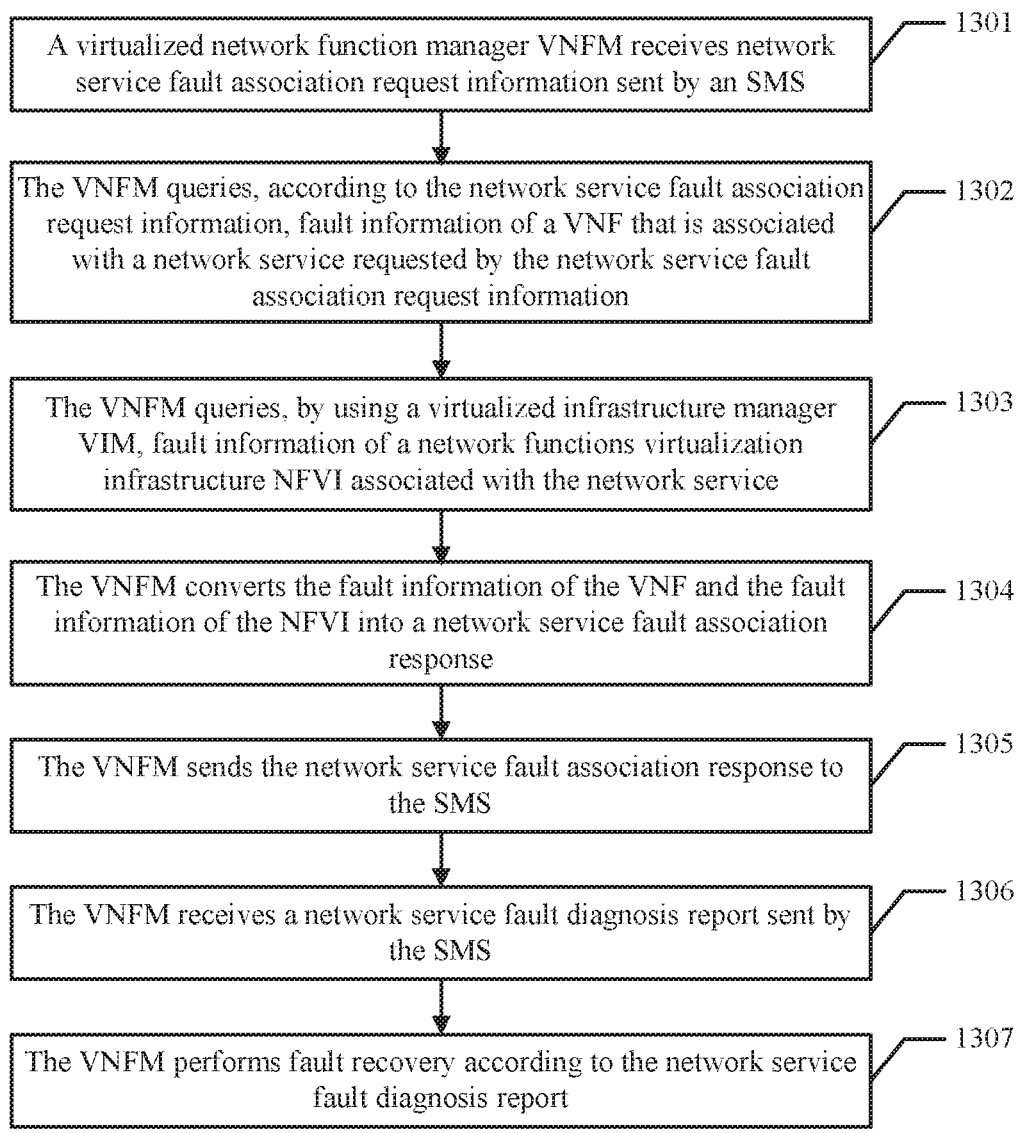
FIG. 13 is another schematic flowchart of a network service fault handling method according to an embodiment.

When the system management module is the virtualized network function manager VNFM, referring to FIG. 13, another embodiment of a network service fault handling method in the embodiments includes.

1301. The virtualized network function manager VNFM receives network service fault association request information sent by an SMS.

When the SMS sends the network service fault association request information to the VNFM, the VNFM receives the network service fault association request information sent by the SMS.

1302. The VNFM queries, according to the network service fault association request information, fault information of a VNF that is associated with a network service requested by the network service fault association request information.

After receiving the network service fault association request information, the VNFM queries the fault information of the VNF that is associated with the network service requested by the network service fault association request information.

1303. The VNFM queries, by using a virtualized infrastructure manager VIM, fault information of a network functions virtualization infrastructure NFVI associated with the network service.

After receiving the network service fault association request information, the VNFM may send the network service fault association request information to the VIM, so that the VIM queries the fault information of the NFVI associated with the network service.

1304. The VNFM converts the fault information of the VNF and the fault information of the NFVI into a network service fault association response.

After finding the fault information of the VNF and the fault information of the NFVI, the VNFM converts the fault information into the network service fault association response.

1305. The VNFM sends the network service fault association response to the SMS.

After obtaining the network service fault management response, the VNFM sends the network service fault association response to the SMS, where the network service fault association response is used by the SMS to perform fault analysis on a network service.

1306. The VNFM receives a network service fault diagnosis report sent by the SMS.

When the SMS sends the network service fault diagnosis report to the VNFM, the VNFM receives the network service fault diagnosis report sent by the SMS, where the network service fault diagnosis report is obtained after the SMS performs fault diagnosis according to the network service fault association response and operating performance data of the virtual network function entity VNF.

1307. The VNFM performs fault recovery according to the network service fault diagnosis report.

After obtaining the network service fault diagnosis report, the VNFM performs fault recovery according to the network service fault diagnosis report.

The VNFM may obtain, by means of parsing, a root fault and a root fault handling decision that are in the network service fault diagnosis report; if a fault occurs in the VNF, the VNF may be restarted, or the VNF may be migrated, or the VNF may be re-instantiated; if a fault occurs in the NFVI, restart, migration, or the like may be performed, which is not limited herein.

In an actual application, after performing fault recovery, the VNFM may feed back a fault recovery notification to the SMS, so as to notify the SMS that fault recovery has been performed; after receiving the fault recovery notification and when detecting that the fault has been resolved, the SMS may send a network service fault recovery notification to the VNFM, so as to notify the NMS that the fault has been resolved.

In this embodiment, when a system management module is a VNFM, after receiving network service fault association response information, the VNFM may query fault information of a VNF, query fault information of an NFVI by using a VIM, and then convert the fault information of the VNF and the fault information of the NFVI into a network service fault association response. In this way, compared with querying faults of the VNF and the NFVI in another manner, performing a fault query on the VNF and the NFVI by using the virtualized network function manager VNFM can obtain fault information more quickly, which improves efficiency of querying a fault.

It may be understood that, in addition to being the NMS or the VNFM separately, the system management module may also be a combination of the NMS and the VNFM; when the system management module includes the NMS and the VNFM, the SMS may send a network service fault association request message to the NMS and the VNFM simultaneously, which is not limited herein.

For ease of understanding, the following specifically describes the network service fault handling method in this embodiment by using a specific application scenario.

The VNFM receives network service fault association request information sent by the SMS, where the network service fault association request information includes that VNF-4 is overloaded; the VNFM queries, according to the network service fault association request information, fault information that is of a VNF and associated with VNF-4, and learns that: VNF-2 is normal, and service performance is overloaded; VNF-4 is normal, and service performance is overloaded; the VNFM queries, by using the VIM, fault information that is of an NFVI and associated with VNF-4, and learns that the NFVI is faulty and throughput is 0; the VNFM converts the fault information of the VNF (VNF-2 is normal, and service performance is overloaded; VNF-4 is normal, and service performance is overloaded) and the fault information of the NFVI (the NFVI is faulty and the throughput is 0) into a network service fault association response; the VNFM sends the network service fault management response to the SMS; the VNFM receives a network service fault diagnosis report sent by the SMS, where the network service fault diagnosis report includes that a root fault is a fault in the NFVI, a root fault handling decision is to restart the NFVI, and pseudo faults are faults in VNF-1 and VNF-4; and the VNFM restarts the NFVI according to the network service fault diagnosis report.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A system, comprising:
   an input apparatus;
   an output apparatus;
   a processor;
   a bus coupled to the input apparatus, the output apparatus and the processor; and
   a non-transitory computer readable storage medium storing a programming for execution by the processor, the program including instructions for:
      monitoring operating performance data of a virtual network function entity (VNF);
      determining, according to the operating performance data of the VNF, whether network service performance is abnormal;
      sending network service fault association request information to a system management module in response to the network service performance being abnormal, wherein the network service fault association request information is used by the system management module to query a fault and to feed back a network service fault association response;
      performing fault diagnosis according to the network service fault association response and the operating performance data of the VNF, to obtain a network service fault diagnosis report, wherein the instructions for performing the fault diagnosis include instructions for:
         determining a root fault and a pseudo fault in accordance with the operating performance data of the VNF and the network service fault association response, wherein the root fault is a fault associated with a first device, wherein the pseudo fault is a fault associated with a second device that is operating normally, wherein the pseudo fault is indicated by operating performance data of the VNF falling outside of a configuration parameter value range for the second device, and wherein the pseudo fault is a fault that can be resolved by recovery from the root fault;
         performing analysis on the root fault and the pseudo fault, to obtain a handling policy; and
         generating the network service fault diagnosis report according to the root fault, the pseudo fault, and the handling policy; and
      sending the network service fault diagnosis report to the system management module, wherein the network service fault diagnosis report is used by the system management module to perform fault recovery.

2. The system according to claim 1, wherein the instructions include instructions for periodically receiving the operating performance data of the VNF sent by an element management system (EMS).

3. The system according to claim 2, wherein the instructions include instructions for:
   receiving a configuration parameter value range sent from an orchestrator;
   determining whether the operating performance data of the VNF falls within the configuration parameter value range;
   in response to the operating performance data of the VNF falling within the configuration parameter value range, determining that the network service performance is normal; and
   in response to the operating performance data of the VNF falling outside the configuration parameter value range, determining that the network service performance is abnormal.

4. The system according to claim 1, wherein the instructions include instructions for:
   searching a data fault information list in accordance with anomaly data in the operating performance data of the VNF and fault information in the network service fault association response, to obtain the root fault and the pseudo fault.

5. The system according to claim 1, wherein the operating performance data comprises:
   throughput, a delay, or bandwidth.

6. The system according to claim 1, wherein the network service fault diagnosis report causes the system management module to perform fault recovery by performing at least one of restarting the first device or migrating a service function from the first device.

7. The system according to claim 6, wherein the network service fault diagnosis report causes the system management module to perform fault recovery by restarting the first device without restarting the second device.

8. A system, comprising:
an input apparatus;
an output apparatus;
a processor;
a bus coupled to the input apparatus, the output apparatus, and the processor; and
a non-transitory computer readable storage medium storing a programming for execution by the processor, the program including instructions for:
receiving network service fault association request information from a service management system (SMS);
querying fault information within a management scope according to the network service fault association request information;
converting the fault information into a network service fault association response;
sending the network service fault association response to the SMS;
receiving a network service fault diagnosis report from the SMS, wherein the network service fault diagnosis report is obtained after the SMS performs fault diagnosis according to the network service fault association response, operating performance data of a virtual network function entity (VNF), and a root fault and a pseudo fault, wherein the root fault is a fault associated with a first device, wherein the pseudo fault is a fault associated with a second device that is operating normally, wherein the pseudo fault is indicated by operating performance data of the VNF falling outside of a configuration parameter value range for the second device, and wherein the pseudo fault is a fault that can be resolved by recovery from the root fault; and
performing fault recovery according to the network service fault diagnosis report.

9. The system according to claim 8, wherein the system is a network management system (NMS), and the instructions include instructions for:
querying fault information of a device that is managed by the NMS.

10. The system according to claim 8, wherein the system is a virtualized network function manager (VNFM), and the instructions include instructions for:
querying fault information of a VNF that is associated with a network service requested by the network service fault association request information;
querying, by using a virtualized infrastructure manager (VIM), fault information of a network functions virtualization infrastructure (NFVI) associated with the network service; and
converting the fault information of the VNF and the fault information of the NFVI into the network service fault association response.

11. A method, comprising:
monitoring, by a service management system (SMS), operating performance data of a virtual network function entity (VNF);
determining according to the operating performance data of the VNF, whether network service performance is abnormal;
sending, by the SMS, in response to the network service performance being abnormal, network service fault association request information to a system management module, wherein the network service fault association request information is used by the system management module to query a fault and to feed back a network service fault association response to the SMS;
performing fault diagnosis according to the network service fault association response and the operating performance data of the VNF, to obtain a network service fault diagnosis report, wherein the performing the fault diagnosis comprises:
determining a root fault and a pseudo fault in accordance with the operating performance data of the VNF and the network service fault association response, wherein the root fault is a fault associated with a first device, wherein the pseudo fault is a fault associated with a second device that is operating normally, wherein the pseudo fault is indicated by operating performance data of the VNF falling outside of a configuration parameter value range for the second device, and wherein the pseudo fault is a fault that can be resolved by recovery from the root fault;
performing analysis on the root fault and the pseudo fault, to obtain a handling policy; and
generating the network service fault diagnosis report according to the root fault, the Pseudo fault, and the handling policy; and
sending, by the SMS, the network service fault diagnosis report to the system management module, wherein the network service fault diagnosis report is used by the system management module to perform fault recovery.

12. The method according claim 11, wherein monitoring, by the service management system (SMS), operating performance data of the VNF comprises:
periodically receiving, by the SMS, the operating performance data of the VNF sent by an element management system (EMS).

13. The method according to claim 12, wherein the operating performance data comprises:
throughput, a delay, or bandwidth.

14. The method according to claim 12, the method further comprising:
receiving, by the SMS, a configuration parameter value range sent by an orchestrator, before determining according to the operating performance data of the VNF, whether the network service performance is abnormal, wherein determining, according to the operating performance data of the VNF, whether the network service performance is abnormal comprises:
determining whether the operating performance data of the VNF falls within the configuration parameter value range;
in response to the operating performance data of the VNF falling within the configuration parameter value range, determining that the network service performance is normal; and
in response to the operating performance data of the VNF not falling within the configuration parameter value range, determining that the network service performance is abnormal.

15. The method according to claim 11, wherein determining the root fault and the pseudo fault in accordance with the operating performance data of the VNF and the network service fault association response comprises:

searching a data fault information list in accordance with anomaly data in the operating performance data of the VNF and fault information in the network service fault association response, to obtain the root fault and the pseudo fault.

16. The method according to claim 11, wherein the network service fault association request information comprises:
a network service identifier and network service performance anomaly data, wherein the network service identifier is uniquely identifies a network service in a network, and the network service performance anomaly data indicates statistical data of one or more performance anomalies of a network service.

17. The method according to claim 16, wherein the network service fault association response comprises:
the network service identifier, fault information, and a fault type, wherein the fault information identifies an entity in which a fault occurs, and the fault type is used to identify a type of the fault.

18. The method according to claim 17, wherein the network service fault diagnosis report comprises:
the network service identifier, a root fault, and a root fault handling policy, wherein the root fault indicates a root of a network service anomaly, and the root fault handling policy indicates a policy that handles the root fault.

19. The method according to claim 11, wherein the system management module is:
a network management system (NMS) or a virtualized network function manager (VNFM).

20. The method according to claim 11, wherein the performing the fault recovery comprises performing at least one of restarting the first device or migrating a service function from the first device.

* * * * *